US007523411B2

(12) United States Patent
Carlin

(10) Patent No.: US 7,523,411 B2
(45) Date of Patent: Apr. 21, 2009

(54) NETWORK-LINKED INTERACTIVE THREE-DIMENSIONAL COMPOSITION AND DISPLAY OF SALEABLE OBJECTS IN SITU IN VIEWER-SELECTED SCENES FOR PURPOSES OF OBJECT PROMOTION AND PROCUREMENT, AND GENERATION OF OBJECT ADVERTISEMENTS

(76) Inventor: Bruce Carlin, 957 Tingley La., San Diego, CA (US) 92106-2969

( * ) Notice: Subject to any disclaimer, the term of this patent is extended or adjusted under 35 U.S.C. 154(b) by 438 days.

(21) Appl. No.: 10/081,841

(22) Filed: Feb. 20, 2002

(65) Prior Publication Data

US 2002/0093538 A1 Jul. 18, 2002

Related U.S. Application Data

(63) Continuation-in-part of application No. 09/643,507, filed on Aug. 22, 2000.

(51) Int. Cl.
*G06F 3/048* (2006.01)
(52) U.S. Cl. .................. 715/782; 715/282; 715/764; 715/783; 705/27; 345/582; 345/419
(58) Field of Classification Search ............... 345/582, 345/419; 705/27; 715/764, 782
See application file for complete search history.

(56) References Cited

U.S. PATENT DOCUMENTS 5,255,352 A * 10/1993 Falk ........................ 345/582
5,847,971 A * 12/1998 Ladner et al. .................. 703/1
5,898,438 A * 4/1999 Stewart et al. ............... 345/419
5,982,378 A * 11/1999 Kato ........................ 345/582
6,002,853 A * 12/1999 de Hond .................... 709/219
6,005,969 A * 12/1999 Thomas et al. .............. 382/162
6,014,503 A * 1/2000 Nagata et al. ................ 703/1

(Continued)

OTHER PUBLICATIONS

Bourke, Paul et al, "Generating Hiddenline (wireframe) Images with Rendering Software", Mar. 1993. pp. 1-3 http://astronomy.swin.edu.au/~pbourke/rendering/wireframe/.*

(Continued)

*Primary Examiner*—Steven B Theriault
(74) *Attorney, Agent, or Firm*—Fuess & Davidenas

(57) ABSTRACT

A design professional such as an interior designer, furniture sales associate or advertising designer or a consumer running a program at a client computer (i) interactively selects or specifies a background scene and furnishings or other objects, (ii) interactively previews these objects in a small low-quality perspective view image of the scene, and then (iii) utilizing the world wide web transmits the scene file to a server computer, (iv) this server then renders a typically larger high-quality version of the previewed scene, utilizing high-resolution objects to replace the stand-in objects used to render the preview image on the client computer, (v) which high-quality image is returned to the client computer for viewing. 3D models and related textures and maps are built for each object to be depicted in the virtual scenes. For transmission efficiency, the scene file transmitted to the server may contain only the name of stand-in models and textures used in the scene, rather than the actual geometry and maps, if these reside on the server. Images so produced serve to promote the sale of visually-attractive goods depicted by providing the designer and consumer with in-context visualization.

23 Claims, 8 Drawing Sheets

U.S. PATENT DOCUMENTS

| | | | | |
|---|---|---|---|---|
| 6,052,669 | A * | 4/2000 | Smith et al. | 705/26 |
| 6,226,004 | B1 * | 5/2001 | Nishihara | 345/420 |
| 6,331,858 | B2 * | 12/2001 | Fisher | 345/582 |
| 6,389,322 | B1 * | 5/2002 | Park et al. | 700/98 |
| 6,414,679 | B1 * | 7/2002 | Miodonski et al. | 345/420 |
| 6,456,287 | B1 * | 9/2002 | Kamen et al. | 345/427 |
| 6,611,267 | B2 * | 8/2003 | Migdal et al. | 345/428 |
| 6,724,407 | B1 * | 4/2004 | Cheng | 715/848 |
| 6,727,925 | B1 * | 4/2004 | Bourdelais | 715/852 |
| 6,912,293 | B1 * | 6/2005 | Korobkin | 382/100 |
| 7,148,899 | B2 * | 12/2006 | Dumesny et al. | 345/582 |
| 7,149,333 | B2 * | 12/2006 | Pieper et al. | 382/128 |
| 7,149,665 | B2 * | 12/2006 | Feld et al. | 703/2 |
| 7,193,633 | B1 * | 3/2007 | Reinhardt et al. | 345/629 |
| 2002/0010655 | A1 * | 1/2002 | Kjallstrom | 705/27 |
| 2005/0081161 | A1 * | 4/2005 | MacInnes et al. | 715/765 |

OTHER PUBLICATIONS

Technicon Inc., et a. "Technicon Interactive Showroom" Apr. 1999. http://web.archive.org/web/19990427160420/http://www.technicon.com/.*

Technicon et al. : "Interactive Electronic commerce coming to the furniture and web procurement industries" Mar. 1999.*

Technicon et al. "ShowroomDemo" (captured images) Feb. 1999.*

SolidWorks et al. "SolidWorks introduces beta version of 3D java viewer" Jan. 1999.*

SolidWorks et al. "SolidWorks introduces 3D PartStream.NET service" Oct. 2000.*

Schneider, Daniel et al. "Introduction to the VRML Standard and 3D graphics" 1998.*

* cited by examiner

NETWORK-LINKED INTERACTIVE THREE-DIMENSIONAL COMPOSITION AND DISPLAY OF SALEABLE OBJECTS IN SITU IN VIEWER-SELECTED SCENES FOR PURPOSES OF OBJECT PROMOTION AND PROCUREMENT, AND GENERATION OF OBJECT ADVERTISEMENTS

REFERENCE TO A RELATED PATENT APPLICATION

The present patent application is related as a continuation-in-part to U.S. patent application Ser. No. 09/643,507 filed on Aug. 22, 2000, to inventors including the inventor of the present application, and having the title NETWORK-LINKED INTERACTIVE THREE-DIMENSIONAL COMPOSITION AND DISPLAY OF SALEABLE OBJECTS IN SITU IN VIEWER-SELECTED SCENES FOR PURPOSES OF PROMOTION AND PROCUREMENT. The contents of the related patent application are incorporated herein by reference.

BACKGROUND OF THE INVENTION

1. Field of the Invention

The present invention generally concerns the computerized composition and display of photorealistic perspective images of real or virtual three-dimensional objects, most typically objects for sale, located in, surrounding or in front of, real or virtual three-dimensional scenes where the objects are not fanciful, and the scenes are generally not fanciful, but are or could be existing within the real world, for the purposes of (i) promoting or selling the depicted objects directly to a consumer, and/or (ii) generating advertising images of the objects.

The composition and display may be, by way of example, the selection and placement of furniture and furnishings within interior rooms for purposes of promoting or selling such furniture and furnishings as depicted in photorealistic three-dimensional scenes chosen or specified by and potentially unique to the viewer, such as in the viewer's own home or a scene for an image to be used in an advertisement.

The present invention particularly concerns the communications-network-linked software-program-driven computerized selection, composition and photorealistic imaging of objects such as furniture sand furnishings, including virtual objects that are not yet fabricated, in perspective view and accurately three-dimensionally positioned within real or virtual rooms or scenes responsively to interaction with professional interior designers decorators or sales associates, and/or generators of advertising images; the man-machine interaction being so that designs of, inter alia, (i) furnished rooms may be both interactively developed across a digital communications network and, ultimately, displayed to a prospective consumer-purchaser of the room furnishings and/or (ii) photorealistic advertising images may be interactively developed remotely from any such graphics rendering system as has available the desired objects and textures and is capable of rendering such photorealistic images, and then transmitting them across a digital communications network, the development using only computer graphics objects, textures, maps and other such input to computer-based image rendering systems, some of which may have been derived from photographic sources.

The present invention also particularly concerns communications-network-linked software-program-driven computerized selection, composition and display—in response to interaction with professional designers and creative advertising copyists—of photorealistic three-dimensional renderings of goods suitable for presentation directly from the network, or indirectly such as via a print medium, to a potential consumer(s) of the goods, and methods of doing business based on the generation and presentation of such photo-realistic images.

2. Background 2.1 General Background

The present invention will be seen to have both (i) business and (ii) technical aspects. Technically, the present invention will be seen to broadly concern a software-based system for both (i) interactively producing, and (ii) rendering, across a digital communications network, photo-realistic composite images of interactively customized products in such surroundings as are customary to and specified by the viewer of the image, different viewers desiring and appreciating different surroundings. Business-wise, this rendering, typically conducted as a network service at no cost to enrolled business professionals, is for the purpose of promoting and selling such products. These customary surroundings are referred to herein as "background scenes". The selected and placed product images will be seen to include, by way of example, images of interior furnishings, rendered within background scenes of interior spaces.

2.2 Previous Patents Directed to Interior or Exterior Design

U.S. Pat. No. 4,318,121 to Taite, et. al., for INTERIOR DECOR COMPOSITION AND DISPLAY SYSTEMS concerns display systems are of particular utility in assisting interior decorators and homemakers in selecting appropriate color and fabric combinations. In particular, the subject display systems provide a luminous image of an interior decor including components, such as furniture, drapes and carpets. The system picks up colors from different samples, each of which typically has an area smaller than the area of any displayed component. These picked-up colors are selectively filled in the displayed components when the image is displayed. Color arrangements are changed by substituting other picked-up colors in the display of particular components.

U.S. Pat. No. 4,931,929 to Sherman for DESIGN COMPONENT SELECTION COMPUTER WITH SPECIFICATION OF PRODUCT CHARACTERISTICS AND OF COLOR BY MACHINE READABLE DEVICE concerns a process for identification, description and display of design components, such as interior decoration products, selected by describing desired component characteristics to a digital computer. An image database is provided, preferably in the form of an addressable optical videodisk, each frame of which portrays an individual design component, and the images are displayed by operation of a computer-controlled archive system such as a random-access optical videodisk player. A characteristics database is provided to characterize each portrayed design component by a variety of product categories including at least color, price, manufacturer and image database address. The process obtains one or more desired component characteristics, examines the characteristics database to identify design components meeting the desired product characteristics, and displays the identified component images together with a complete record of characteristics for each product. The desired color characteristic can be obtained by selection from a text dictionary of color identification terms, by machine inspection of a machine-readable color comparison sample, or by optical spectrum analysis of a pre-existing product sample.

U.S. Pat. No. 5,255,352 to Falk for MAPPING OF TWO-DIMENSIONAL SURFACE DETAIL ON THREE-DIMEN- SIONAL SURFACES concerns a system and method for providing surface detail to mathematically-defined three-dimensional surfaces which preserves the specific dimensional integrity of the surface detail image being mapped in order to provide dimensionally correct surface detail. This is accomplished by performing the intermediate step of mapping the surface detail image to a two-dimensional flattened pattern piece representation of the surface and thereafter mapping this representation to the three-dimensional surface. The system and method of the present invention may be used as one function of a greater three-dimensional computer aided design system for any industry which utilizes flat sheets of material formed or assembled into a finished product, including textiles, apparel, footwear, upholstered furnishings, automotive or interior design.

U.S. Pat. No. 5,601,431 to Howard for an INTERIOR DESIGN SYSTEM AND METHOD concerns an interior design system comprising a display assembly having three flexible transparent overlays, a plain background sheet hinged to corresponding edges of the overlays, and a template sheet hinged to a free edge of the background sheet and having "scale" background and foreground grid sections. All this is for assisting in laying out interior room decorator's designs with a comprehensive catalog of design elements printed with scale designs of perspective furniture and accessory designs, and architectural elements for creating the room space to be decorated. The catalog pages have rows of printed scale designs covered with transparent plastic, with overlying, selectively removable and replaceable design elements. The design elements have designs that are printed to the same scale on carrier sheets of flexible "static-cling" material. These carrier sheets are rectangular sections that are cut from a printed sheet the same size and shape as the backing sheet. In this manner, the catalog pages provide marked storage positions for the design elements after use.

In addition, the backing sheets are marked with descriptive labels and special coded symbols in distinctive shapes and colors for assisting in selection and coordination of interior designs, and also are imprinted with generic labels for the designs. The method constitutes the steps of (i) providing the catalog of scale images and the background and foreground grid sections, (ii) labeling and coding the images for identification, coordination and storage, (iii) selecting candidate images from the catalog and transferring them to the grid sections, (iv) applying the images in the desired positions and combinations, thereby to create a decorator's design, plus, optionally, (v) applying colors as an overlay on the completed design for a more complete rendering.

U.S. Pat. No. 5,940,806 to Danial for a METHOD AND APPARATUS FOR RECEIVING, STORING AND PROVIDING DATA CORRESPONDING TO GEOMETRICALLY DESCRIBABLE RAW MATERIALS concerns an apparatus and method employing a programmable computer for providing a list of data items corresponding to geometrically describable materials based upon a profile specified by a user. The list of data items is stored in a data base. Each data item includes geometrically descriptive terms and trading parameters identifying characteristics of an item offered for sale by an advertiser. A profile is generated by a user which includes geometrically descriptive terms and trading parameters identifying characteristics of an item sought for purchase by the user. The profile identified by the user is compared to each data item stored in the data base and data items are identified which match the profile. The data item identified are provided to the user in accordance with the user's specific delivery instructions.

U.S. Pat. No. 6,005,969 to Thomas, et. al., concerns METHODS AND SYSTEMS FOR MANIPULATION OF IMAGES OF FLOOR COVERINGS OR OTHER FABRICS that enable a highly streamlined and efficient fabric or textile sampling and design process. The sampling and design process is claimed to be particularly valuable in the design and selection of floor coverings, wall coverings and other interior design treatments. A digital library of fabric models is created, preferably including digitized full-color images associated with digital representations of positions that are located within, and which characterize, the models. Via an application implemented according to conventional software methods and running on conventional hardware having high resolution graphics-processing capabilities, a user may navigate among the set of alternative models, and may modify the positions of the selected models to test out desired combinations of characteristics—such as poms or yarn ends, or models of floor coverings—and view the results in high resolution. A method is provided for substituting colors in digital images of photographic quality, while preserving their realism particularly in the vicinity of shadows. The resulting samples or designs can be stored and transmitted over a telecommunications network or by other means to a central facility that can either generate photographic-quality images of the samples, or can directly generate actual samples of the carpet or other material of interest.

2.3 A Specific Previous Interior Design System Operative on a Private Satellite Down-link, Phone Line Up-link Communications Network The system and method of the present invention will be seen to involve interactive communications across a digital communications network for the purpose of producing images that typically include furniture. At least one previous upholstered furniture customization system involves a real-time network-based interactive system for support of visualizing upholstered furniture prior to placing an order for the upholstered furniture.

This existing interactive system of La-Z-Boy™ Incorporated, and possibly others, is available for use by sales associates in La-Z-Boy™ furniture showrooms. The system permits prospective customers to preview La-Z-Boy furniture upholstered in La-Z-Boy offered fabrics. It requires a La-Z-Boy™ furniture item number, and a La-Z-Boy™ fabric number. The system then maps the fabric onto a static perspective view of the selected furniture item.

To the extent of depicting furniture, this previous system is similar to the system and method of the present invention. However, the system used by La-Z-Boy™ is considerably different from the system of the present invention as to each of, inter alia, (i) system interaction (rote versus sophisticated) with the targeted user (a furniture salesman versus an interior designer), (ii) how the furniture images are generated and presented (2D versus 3D, and fixedly versus being shown in context), (iii) the technical capabilities of the image generation (no provision for scaling, rotation and placement of upholstered furniture images into background scenes), and (iv) the business model supported (retail store furniture promotion vs. a professional-level interior design tool supporting furniture selection, placement and procurement as well as promotion.)

2.4 A Specific Interior Design System Operative on the Internet

The system and method of the present invention will be seen to involve communications across a digital communications network, to wit: the Internet. At least one interactive design system—evolved as a real-time network-based evolution of an older PC-based software program product—already (circa 2000) exists on the Internet. This existing system is superficially similar to the system and method of the present invention. However, the existing system is again considerably different from the system of the present invention as to each of, inter alia, (i) the targeted audience (amateurs versus professionals), (ii) how the images are generated and presented (2D versus 3D), and (iii) the business model supported (furniture and software promotion vs. professional-level design assistance, furniture promotion and procurement.)

The existing interactive system is the called the cMyVision™ Free Internet design software for use in interior, exterior, home and landscape improvement. The cMyVision™ software is a product, and cMyVision™ web site a service, of Visual Applications, Inc. (VisApp), headquartered in Kansas City, Mo. (cMyVision™ is a trademark of VisApp.) VisApp is a publisher of personal visualization technology, with a web site at <http://www.visapp.com> of the year 2000.

Use of cMyVision™ Free Internet design software for interior, exterior, home and landscape improvement initially requires a digital photo of a house, normally the client's own house. Into this 2D scene a 2D object is inserted from the cMyVision library, or database. The system of the present invention will be seen to differ in that, from two or more 2D views, a 3D model of the client's 3D space, replete with dimensions, is first constructed. Then this 3D space is populated with 3D objects such as furniture. Accordingly, the cMyvision system operates to produce two-dimensional (2D) images while the system of the present invention, employing full three-dimensional (3D) models of both scenes and objects, produces full perspective scene views.

VisApp also sells a product called VisualPhile™ Personal Visualization Software, touted to support professional interior remodeling and design.

VisualPhile™ is personal computer software with the same features as cMyvision™. It runs on a personal computer without an Internet connection, as its library is included with the program. It is primarily suited to providing photo-realistic visualizations of home remodeling as opposed to decorating projects. As in cMyVision™, a certain degree of photo-realism stems from the use of photographs for both rooms and built-ins, appliances and furnishings.

However, there exist inherent limitations—arguably severe when applied to professional interior design—in both cMyVision™ sand VisualPhile™ and their use of digital photographs. These previous systems (i) are not based upon 3D coordinates (as will be seen to be used in the present invention), so furniture images have to be placed and scaled visually by the user; and (ii) the furniture objects are 2D images, so they cannot be rotated to match the angle of the room photograph (as will seen to be the case in the present invention). Therefore, in both cMyVision™ and VisualPhile™, room photos must be taken from a specified perspective, as their furniture photographs are all taken from this angle. Moreover, (iii) because the furniture images are only photographs, and not 3D models, it is not possible to map fabrics on them. This last limitation cannot be mitigated and is highly significant in professional interior design applications.

2.5 Stand Alone Personal Computer Interior Design Programs

A number of software programs are commercially available which support interior design. These programs generally run on personal computers and allow the user to design rooms, place furniture objects into rooms, change wall colors and furniture fabrics, and display the customized furniture in the decorated rooms. Custom Home 3-D Design and Décor, published by Sierra On-line, Inc., 5 in 1 Home Design by Punch! Software LLC, and 3D Home Interiors by Broderbund all support most of these design-assistance and visualization objectives. In addition, numerous commercially-available programs support architectural rendering, including computer-aided design (CAD) programs like AutoCAD, which incorporate 3-D functionality and therefore have application to interior design.

Custom Home 3-D Design and Décor includes a program called Photo Home Interiors™. This program, unlike the others, allows users to import photographs of actual rooms into the program, and then place furniture objects into the room images. The objects include 3-D furniture models, which can be rotated and scaled to fit the scene. However, the room images are not associated with a 3-D model of the room. In other words, while Photo Home Interiors™ does allow furniture objects to be shown as an overlay on top of room photographs, it lacks the capability of rendering furniture objects placed onto floor plans in photographically-derived scenes. Therefore, this program does not allow wall and floor coverings to be displayed in the proper perspective. In addition, the 3-D objects need to be visually scaled by the user to compensate for the perceived distance from the camera position. With this system, it is not possible to evaluate furniture objects of specific dimensions as to scale. For all of these reasons, is cumbersome to use on a personal computer, and would be even more so over a digital communications network.

Furthermore, the furniture objects are generic and therefore not available for purchase, no procurement features are available, the furniture and fabric database is very limited in quantity and quality. Finally, this program does not operate over a digital network.

As a result of such limitations, even this program has limited professional application. These limitations in the prior art are overcome in the present invention, which incorporates proprietary technology developed to support this highly desirable functionality.

2.6 Existing 3D Image Capture Technology

The present invention will be seen to beneficially employ in the generation of three-dimensional (3D) images of a human head a 3D image capture technology. Such a technology is commercially available, circa 2000, from Minolta Co., Ltd. in combination with MetaCreations, Inc., in the 3D 1500 camera product. The 3D 1500 is a complete hardware/software package that combines a quality Minolta digital camera with MetaCreation's MetaFlash 3D image production technology. It allows creation of high-quality 3D models in MetaCreation's MetaStream file format, which can be transmitted quickly over the network for further manipulation.

Another example of a three-dimensional (3D) image acquisition system for deriving 3D models of the human head is the ShapeSnatcher 3D-Toolkit from Eyetronics, Inc. After calibration, data can be captured within the time needed for a single photograph or frame. The 3D model is textured, with a perfect alignment between the shape and the texture. Skin color, marks or scars are visible as they would be on a photograph.

2.7 Relationship to the Predecessor Patent Application

The present patent application, a continuation-in-part of U.S. patent application Ser. No. 09/643,507 filed on Aug. 22, 2000, may be perceived as relating to that application for being the substantial equivalent thereof, incorporating only a somewhat narrow change. Namely, a change is made in (i) what software-based functions are performed at the computer of a (network-connected) user/viewer/client/prospective purchaser, and (ii) what particular display is preliminarily visible to the user/viewer/client/prospective purchaser (at a time before a photorealistic 3-D image of selected, and selectively positioned and selectively illuminated, objects is centrally generated, and communicated across the communications network to the user/viewer/client/prospective purchaser). Namely, the predecessor application discusses "object based rules" and "2D to 3D translation" in that a (top) plan view of a room (or the like) showing the locations and rotations of scene objects (typically furniture) is combined with object-based rules (i.e., chairs always stand on their legs on the floor) to generate a scene file suitable for a high-powered graphics server to produce a photorealistic rendering of 3D objects in 3D scenes.

The present invention, and application, in no way repudiates this earlier approach, but is simply a variant thereof. Namely, the user/viewer/client/prospective purchaser constructs (i) by (conventional, circa 2002) graphics software process at his/her computer, and (ii) by use of miniature "stand-in" models and textures that represent items that will ultimately be rendered with photo-realism on a remote rendering system, a scene of cartoonish-like, even stick-figure, models and textures, located within a room or other scene. The user/viewer/client/prospective purchaser can thus preview and adjust a perspective view—replete with lighting, and sometimes even including color(s) and/or texture(s)—of the scene, rather than just a plan view of the layout of the objects within the scene. Such adjustments to the preview view would include changes to the angle of view, the location, height and direction of the camera, the position of lights and illumination levels.

Clearly the fundamental aspect of the previous invention to the effect that (i) graphics manipulation tractable, and suitable, to the skills and the software and the power of a user computer should be done at the user computer, while (ii) photo-realistic scene rendering in done on a server (or allied) computer, is not changed in the present invention. Clearly the fundamental aspect of the previous invention to ultimately render a photo-realistic image of selected items in situ is not changed in the present invention.

In a broader view, the present invention and application may be perceived to validate the former invention and application. Namely, even if both applications arise from the same source—which they do—the scope of the method of both inventions of photo-realistically displaying goods selected by a user/viewer/client/prospective purchaser in situ an environment also selected or specified by the user/viewer/client/prospective purchaser is broadened when it is realized that it is not the details of the process—presenting a plan image versus a low resolution 3D perspective view image to the user/viewer/client/prospective purchaser—that are important, but the overall flow of information, and the overall generation of a photorealistic image using computational resources of the user/viewer/client/prospective purchaser to "frame" the scene, and the greater computational resources of a server and allied computers to, ultimately, render the 3D objects in a 3D scene with the full photorealism that is perceived to be required for an optimally informed purchasing decision.

2.9 Web 3D

The present invention will be seen to use at client computers an ordinary, low level, graphics capability that is, circa 2002, increasingly being built into browser and browser plug-ins.

One leading standard for the generation of 3D images over the Internet is Web3D. In applications such as that of the present invention a preview that can be directly based on Web3D permits a preview of a scene. A Web3D application may, and often does, present to the user controls for placing and adjusting objects (in the broad sense of this word, including scenes), and selecting textures. This will be seen to be of paramount importance in the use of the present invention in the development of photorealistic images, including for advertising.

Accordingly, as background to the present invention, the Web3D Consortium, Inc.—expounded at <www.web3d.org>—is a nonprofit corporation with the mission of fostering and evangelizing all three-dimensional technologies on the Internet. The Web3D Consortium's goals are to: (1) foster the ongoing development of three dimensional specifications and standards on the Internet, (2) promote rapid industry adoption of and adherence to the X3D specification; (3) offer opportunities for the three-dimensional development community to meet and cooperate in the evolution of Web3D technologies; (4) educate the business and consumer communities on the value, benefits and applications of three dimensional technologies on the Internet; (5) support the creation of conformance tests to assure Web3D interoperability; and (6) liaison with educational institutions, government research institutes, technology consortia, and other organizations which support and contribute to the development of specifications and standards for Web3D.

The Web3D Consortium was formed to provide a forum for the creation of open standards for Web3D specifications, and to accelerate the worldwide demand for products based on these standards through the sponsorship of market and user education programs. Web3D applications have been actively pursued by many organizations for quite some time. This community has spearheaded the development of the VRML 1.0 and 2.0 specifications, which provide the basis for the development of associated applications. The organizations involved in this effort felt that the creation of an open consortium focused exclusively on Web3D would provide the structure necessary to stabilize, standardize, and nurture the technology for the entire community.

Today, year 2002, the Web3D Consortium is utilizing its 1500-2000 strong Internet development community, and its broad-based industry support to systematically move the VRML97 ISO Standard forward. Its many prominent technical activities include the Extensible 3D (X3D) specification, which is extending VRML97, using the Extensible Markup Language (XML). Through the well-coordinated efforts of dedicated Working and Task Groups and ISO/W3C Liaisons, the Web3D Consortium is maintaining and extending its standardization activities well into the next Millennium.

There are numerous sources of information on authoring Web3D content for both programmers and, increasingly, designers.

A Web3D Browser is a piece of software that lets you view and navigate around a 3D scene over the Web, for example a VRML file. These browsers can either be stand alone programs or, more typically, they are plug-ins for common Web browsers such as Netscape Communicator or Internet Explorer. A number of companies produce Web3D products. A few of the common systems in use circa 2002 include the following: Actify 3DView, Conmtact from Blaxxun Interactive; Cortona from ParallelGraphics; Cosmo Player from Platinum Technologies; Fraunhofer Institute CASUS Presenter; Graz University VRWave; Java X3D Browser; Open-Worlds Horizon Browsers; Shout3d from Eyematic; Sony Community Place; Superscape Viscape Support; UpperCut Software WorldProbe. A more complete list of Web3D browser software can be found at the aforementioned web3D web site.

SUMMARY OF THE INVENTION

The present invention, and its predecessor that is a subject of a related patent application, have both (i) business and (ii) technical aspects.

1. Technical Aspects of the Present Invention, Which Employs Computer Graphics

The present and related predecessor inventions involve "state-of-the-art" computer graphics circa 2002, but are not strictly about computer graphics. Instead, the present and related predecessor inventions teach to, and how to, partition upon a communications network such functionality as realizes the still-considerable challenge of generating and displaying a photorealistic three-dimensional custom image to a viewer and/or image designer/creator—for example a custom image of individual items of furniture and furnishings selected from a vast catalog, and placed, oriented, colored and/or textured and illuminated in a custom scene.

In simplest terms, the present and related inventions contemplate that (i) certain image selection, specification and manipulation tools, like as and/or including Web3D and room layout tools, and (ii) a system of model and texture pairs (high and low resolution) are made available across a communications network, typically the Internet, to a typically modest, user/viewer/client/prospective purchaser, computer system running, most commonly, a browser program with a plug-in module. This client system manipulates only modestly-sized, low resolution, (3D) objects and textures.

However, from use of only these modest resources, with a modest computer computational load, and with a fairly simple and intuitive user interface, the user/viewer/client/prospective purchaser, and/or his/her/their support professionals, are able to recognize, and to specify, a typically complex scene. The specified scene parameters sent to a server computer—typically with great computational power in a computer system running one or more copies of a complex graphics rendering program—and is rendered (re-rendered) photorealistically, meaning the scene is re-created by substituting high resolution models and textures and lighting for the stand-ins used for scene design and preview, and by using a photorealistic rendering system like ray tracing, such that the desired custom scene is rendered with photorealistic fidelity, and then returned to the client computer for display (including by printing).

The user-specified scene with user-specified and user-located objects rendered by the server graphics computer (which is also upon the communications network) is delivered (back) (after processing delay, and not in real time) to the requesting user/viewer/client/prospective purchaser computer, where it is displayed. In this manner the computational, and program, requirements of the user/viewer/client/prospective purchaser computer are minimized, while the expensive and sophisticated graphics rendering software that is normally maintained and updated by experts is resident only at the server (and/or allied) computer system. In this manner the movement upon the communications network of huge, multi-megabyte, blocks of high-resolution 3D model data of the depicted objects and scenes is precluded. The high-resolution digital models and textures—which are typically proprietary, and which are obtained at some expense—are maintained relatively securely at the server. Finally, in this manner any creative person who is connected to the network, and to the graphics image rendering service, may design and produce a "world-class" photorealistic image—such as for purpose of serving as advertising images—without having either dedicated access to, nor specialized expertise in, a sophisticated graphics image rendering system.

The server-based rendering of the present invention permits the use of very large (high-resolution) models and textures, and allows such models to remain secure on the server. It would be very time-consuming and expensive (in a bandwidth sense) to download 50 MB of models for rendering on the client. Furthermore such downloads would compromise the security of the models, as they could then be stolen. Given that relatively inexpensive high-performance computers are now readily available and in use by business, it is the security and data transmission speed issues that are the real competitive advantage of server-based rendering in business applications. Also, keeping the large models and textures on the server allows for relatively easy maintenance of the database. If the high-resolution models were distributed, updating them to current versions would become very difficult and expensive. The system of the present invention that combines client rendering of small stand-in models and textures with server-based rendering of proprietary high-resolution models and textures is the best of both worlds.

Accordingly, just as Gutenberg can be said with the invention of the printing press to have made every man his own printer, and Carlson can with his invention of xerography to have made every man his own publisher, the present invention endeavors to make every man—at least as is in accordance with the present and related inventions connected on the Internet to a graphics image rendering service—his own multimedia designer, permitting the individual to have rendered such photorealistic scenes as are essentially limited only by his or her imagination and the specified or available models and textures.

2. Business Aspects of the Present Invention

The business method of the present and predecessor inventions is based on a software-based computerized system for both (i) interactively selecting and, if useful, customizing both objects and object environments, so as to ultimately (ii) render composite perspective 3D images—which images are normally and strongly preferably photo-realistic—of the interactively-selected and customized objects. The object images are so in the context of such image surroundings as are customary to the individual viewer, different viewers desiring and appreciating different customary surroundings.

All (i) the interactive selection and (ii) the image rendering transpires across a communications network—typically a worldwide digital communications network (the Internet)—is most typically for purposes of advertising, promoting or selling the depicted objects in situ, although the information interchange of the present invention can be used somewhat slowly to create art, games, multimedia presentations and the like.

The objects for which the images are generated are preferably not only products for sale, but products that are strongly beneficially best shown and appreciated in a context strongly relevant to an individual viewer, such as, by way of example, furniture within a person's own present or prospective home. The person is not only induced to buy an object by seeing it (photorealistically) in-situ, but may sometimes be induced to order matching objects, such as furnishings or additional furniture pieces color-coordinated with a selected piece. The seller, for example a furniture manufacturer, need neither make nor stock the item being interactively rendered photorealistically for sale, for example a rug or a painting, and need only coordinate to have any purchases "drop shipped" from the actual source. Finally, onerous and unprofitable returns are minimized because the purchaser can "see" how the ordered objects (such as furniture and furnishings) will actually look in situ before they are even purchased. Such in-context visualization is very helpful in stimulating purchase decisions of visually attractive products.

The object/product selection and image rendering service is normally furnished for use upon a digital communications network, and preferably on the Internet, for authorized (licensed) users of the system, of the present invention, which users are generally allowed access to detailed, high-resolution digital models and related textures and maps of the objects that will be photorealistically rendered and depicted. The high resolution of the models is typically evidenced by a very large number of polygons, particularly when the objects have complex geometric shapes. This allows photorealistic images to be rendered, even when the camera is positioned very close to the object, that is zoomed-in. Services of the system of the present invention may be offered (i) though retail outlets of the manufacturer of the depicted goods, or (ii) to bona fide design professionals (whether for fee for use, or merely to promote sale of the goods), and/or (iii) for fee to those parties who may wish to use the models, and the digital image rendering services, but who will not be furnishing further revenues, such as by purchasing selected depicted items. The services may be in particular furnished to design professionals (i) so as to help them satisfy the desire of their customers to make informed and confident product selection and purchase decisions, (ii) so as to promote specific merchandise by showing it in an environment with which the prospective customer is both familiar and sympathetic, and (iii) so as to make sales.

The network provider of these services can profit (i) from being the provider/manufacturer of the depicted products, or (ii) from merely being from in the chain of commerce on such products, acting in any remunerative capacity from product advertiser to manufacturer to wholesaler to retailer, and/or (iii) from being a mere service provider or licensor. Note that, much like a modern supermarket, an imaging service provider serving as a middleman (choice (ii) of the preceding sentence) prospectively profits from both ends of the sales and distribution chain: (i) manufacturers and/or suppliers of goods pay in money, or in favorable prices for their goods, in order to have these goods interactively promoted, while (ii) the end purchasers of the goods may also use the brokering and order placement services of the imaging service provider. The system of the present invention benefits everyone from consumer to manufacturer, rendering unnecessary trips to major furniture manufacturing and interior centers merely to see new offerings. With increased customization, and minimal inventories, many "sold" items will exist only as virtual images at the time(s) of sale, and will be efficiently manufactured as and when sold.

Note that the object/product selection and image rendering service is preferably conducted interactively with persons such as store salesman and design professionals having cursory familiarity with even the quite easy user software interface, and not exclusively with the end item product consumer. This is because the sophisticated products that are most advantageously promoted by being photorealistically shown in situ are generally the opposite of commodities, and are typically of "upscale", custom and/or expensive. The products are typically, and preferably, of a nature such that consumer discrimination and taste are involved in product selection—which is exactly why the products are most successfully photorealistically shown three dimensionally in an environment with which the consumer is familiar, and to which the consumer is receptive. Moreover, the purchaser may expect, and may reasonably receive, "turnkey" help and assistance in making his/her/their selections, and the present system provides for this after the presenter is trained for an hour of so.

3. A system Rendering, and Delivering Across a Communications Network, Photorealistic Custom Scene Images Technically, the composite product scene image of the system of the present and predecessor inventions must be, and is, sufficiently accurate and appealing in showing the intended environment of product use so as to induce a favorable opinion of, and/or purchase decision on, the product(s): it is "photorealistic".

What this term "photorealistic" means, exactly and precisely, is of concern to the definition of the present invention. This concern arises in part because the drawings of this disclosure, as printed by the U.S. Patent and Trademark Office within a U.S. Patent, are distinctly not photorealistic. Therefore a viewer of the drawings cannot appreciate the distinction between "photorealism" and mere 3D views, regardless quality.

The concern arises in further part because the particularly preferred image selection and rendering system of the particular present invention makes that such unsophisticated "stick figure" and "cartoonish" images initially rendered by the computer of user/viewer/client/prospective purchaser are now, nonetheless to their crudity, three-dimensional (3D), and are no longer two-dimensional (2D) as in the related predecessor invention. Since (i) the final, photorealistic images generated in both invention are also three dimensional, and (ii) semi-custom 3D images exist son the web circa 2002 (such as at <www.geappliances.com>where General Electric appliances are promoted), there is an understandable tendency on the part of a student of the present specification, and invention, to imagine that all these images (or at least all 3D images) are all entirely located on the same wide spectrum of quality, and that so-called "photorealistic" images are nothing more than images meeting some abstract, and arbitrary, measure of quality, and that, save for the apparent exactitude of their rendering, these "photorealistic" images are not appreciably different than lessor images.

To so imagine would be in error, and would fail to perceive that, at least where patterns and textures are involved which is about 99++% of the real world, photo-realistic images are intrinsically different from lessor, non-photorealistic images. This is because "photorealistic images", as such term is used and defined within this specification, are derived from models of (most commonly real-world) objects where the models have sufficient resolution of polygons so as to permit the geometry, as well as the coloration and shading, of the surface of an object to be rendered in a manner that will be visually perceived as being devoid of artifacts. This is no small, nor arbitrary, distinction. The model of an upholstered chair used in the teaching of this invention contains several hundred thousand polygons, and was derived by multi-dimensional (6 axis) scanning of a real chair, and the manually-assisted editing of the resulting point cloud, over a period of some days using sophisticated state of the art (circa 2002) image acquisition equipments with accompanying computer hardware and software at a cost of, most typically, some thousands of dollars U.S. per model. For comparison, a model within a video game or the like, or at the aforementioned G.E. appliance web site, springs forth from the mind of the model designer (who may, of course, model from life and the real world), and intentionally contains such small number of polygons at low resolution as permits efficient transmission across the Internet within a time period acceptable to the waiting user.

Textures, and lighting effects, may be of course applied to these lessor models. But they do not by these enhancements alone become "photorealistic". They are always but simulations, albeit at times strikingly realistic simulations, of reality. Despite the fact that the highly flexible human brain tends to "forgive these models of their flaws", they do not "hold a candle" when compared side-by-side at large scale (which, alas, cannot be realized in the printed drawings of this specification) to a true photo-realistic rendering. No one believes that he or she is actually viewing scenes from within a real "Castle Wolfenstein" during play (circa 2002) of the exceptionally highly evolved video game so regarding; but a photorealistic image of a (simulated) castle room is just that: an image so strikingly exact so as to look like a quality photograph of a real room.

This brings us to another difference of photorealistic images that is so great so as to strongly arguably amount to an difference in kind, as well as in quality. Rendering an image of a frame in a video game may be accomplished in a personal computer (and associated graphics card) within a time span of milliseconds. Rendering (using ray tracing) a large photorealistic image of a spatially positioned, oriented and illuminated upholstered chair of, typically, some 200,000+polygons may require some minutes on a fast personal computer circa 2002. If a scene has many such objects, such a ray tracing could take an hour or more. Are these images the same because the human brain can recognize a chair in both? A better view, adopted in use of the term "photorealistic" in the present specification, is that a photorealistic image is of good photographic quality, and—when rendered sufficiently large so as to show details such as textures—is thus—in accordance that photographs are of the real world—distinguishable from reality, if at all, from having but minor flaws discernable only by close inspection, and possibly with difficulty. In other words, although "photorealistic" does not mean "indistinguishable from reality", it certainly means "easily and understandably mistakable for reality".

Note that because a "photorealistic" image is accurate and of high fidelity, and is devoid of any glaring artifacts or incongruities, such an image need not be, and typically is not, harsh, but can be, and generally is, somewhat romanticized and flattering, as with a real photograph taken through a veil, or under flattering lighting. This is not difficult to accomplish in rendering a photorealistic image—once it is first recognized that it should be done, and that reality can be brutal. The system and method of the present invention is directed to simultaneously giving (i) a photorealistic image with an image background familiar to the consumer, and (ii) a pleasingly flattering image. The realism of the image may be further enhanced through the use of a system for measuring actual lighting illumination and shadows in photographically-derived background scenes drawn from life, and from the real world. This permits the rendered photorealistic image to project similar lighting and shadows on virtual objects within the image as these objects would in fact encounter should they exist within the real world, and within the scene. In simplest terms, this is simply to say that a "photorealistic" image of, by way of example, a table not yet built, is still a photorealistic image, and in all respects still looks like a real table.

The interior design professional can aid in this process by, for example, subduing lighting in a less appealing portion of a room while dramatically highlighting proposed new furniture and decor. The design professional can also aid in the process by, for example, improving the color tone of the subject, or the angle of view, or the color temperature of the lighting.

4. Details of the Computerized Method of the Present Invention for Generating and Rendering over a Digital Communications Network a Photorealistic Perspective View of a Three-dimensional (3D) Object Selectively Positioned and Angularly Positioned Within a 3D Scene Therefore, in one of its aspects the present invention is embodied in a computerized method of generating and rendering over a digital communications network a photorealistic perspective view of a three-dimensional (3D) object selectively positioned and angularly positioned within a 3D scene.

The method calls for selecting or specifying at a first computer (i) an object with which there is associated a small, low resolution, model of the object and, most commonly also, one or more object textures, (ii) plus a scene with which there is associated a small, low-resolution, model of the scene, and also scene textures. A still further model of (iii) the scene illumination may also be present. [An illumination model is different than an object or a scene model in that there is no appreciable distinction as to high, or low, resolution. Instead the "model" contains only the numbers, locations, and orientations of light sources in the scene, and illuminating the scene when so placed. These illumination "models" normally express attributes—location, cone angle, cone fall off, etc.—that are translated by the middleware into the scene file of the scene. This scene file now expresses the (selected, specified) lighting in the scene, and the illumination of the scene.]

Any, and all, of (i) the object model(s), (ii) the scene model (s), and/or (iii) the illumination model are commonly built by software processes—normally with manual interaction—within a graphics workstation computer. A separate, server, computer serves at other times to deliver onto the communications network the models so built.

The models may be "canned", and pre-existing, for a number of uses at a number of times—as might be models of items of furniture offered for sale—or may be substantially custom, as might be a scene model of a particular room generated from client-supplied specifications.

A first, rudimentary, low resolution 3D image of the (textured) object in the (textured) scene is rendered at the first computer from at least (i) the small, low resolution, 3D object model, and (ii) the small, low resolution, scene model. A simple model of the scene lighting (illumination) may also optionally be used in production of the preview (low resolution 3D perspective view) scene image. A human—a user/viewer/client/prospective purchaser or the professional representative, such as an interior designer, of such a person—manually interfaces with the computer and with software processes operating within the computer to positionally place, and to orient, the object in the scene, thus developing location and orientation coordinates for each object in the scene.

The identity of the selected object, at least the identity of the scene, and these location and orientation coordinates are then communicated from the first computer upon a digital communications network to a second computer.

From at least the received identity of the object a selection is made in the second computer of a large 3D model and associated textures of at least the selected object, if not also the selected scene. The second, server, computer acts in accordance with rendering instructions. These may be predetermined to the second computer, or they may be chosen by the user/viewer/client/prospective purchaser at the first computer, and sent to the second computer across the communications network. Such rendering instructions may, among other things, specify that the rendering should be at less than full maximum, photorealistic, fidelity in order to save time because the scene depiction then desired—although much better than the low resolution models—is but a "trail balloon" whereby the user/viewer/client/prospective purchaser can gain a sense of what is developing.

The second computer is then used to render a second, photorealistic, high resolution 3D composite image of the object both located and oriented in the scene at the respective location and orientation coordinates, and with the specified lighting. The second computer is normally much more powerful than is the first computer, and executes a typically expensive, and extensive, graphics image rendering program that would be at the least cumbersome, and at the most disproportionately sized and costed to the rendering task at hand, to run upon the first computer of the user/viewer/client/prospective purchaser.

At the conclusion of the rendering, the rendered second, photorealistic, 3D composite image is communicated from the second computer upon the digital communications network (back) to the first computer. This photorealistic, 3D composite image, is then displayed at the first computer.

5. A Computerized Method of Generating and Rendering Over a Digital Communications Network a Photorealistic Perspective View In another of its aspects the present invention is embodied in a computerized method of generating and rendering over a digital communications network a photorealistic perspective view of (i) a three-dimensional (3D) object that can exist in the real world located within, surrounding, or in front of, (ii) a 3D scene that can also exist in the real world.

This method of presenting a perspective image of a 3D object in a 3D scene commences by rendering at a first computer, communicative upon a digital communications network, a first 3D composite image from (1) a small, low resolution, 3D model of a background, and (2) a small, low resolution, 3D model of a selected suitably-real-world object, in consideration of (3) selected 3D coordinate position and angular orientation of the object and, optionally but normally, (4) a simple model of the scene lighting. The rendering of the 3D model of the object placed at the selected position and angular orientation in the 3D model of the background thus produces as the first 3D image a rudimentary 3D perspective view showing the object in the background.

This image need not be transmitted, but the information (1)-(4) along with image size and other image parameters is transmitted from the first and/or second computer upon the digital communications, and is received at another, second, computer. This information may be, and commonly, is re-formatted and edited at the second computer into a scene file that is suitable for rendering by a standard graphics rendering engine. This interface between low-resolution and high-resolution models is relatively straightforward and conventional, the main difference of the present invention being that the functions and the functionality are divided between separate (and generally unequal) computers upon a communications network.

From at least the received information (2), the second computer selects (2a) a high-resolution 3D model of a selected suitably-real-world object. This (2a) large object model may next be coupled with (4) a paired large 3D model of a background. Most commonly, however, the large 3D background model is generated from specification data provided to the second computer from the first computer. In other words, the same specification data that is used at the first computer to generate an image of the background at low resolution is again used, as and when communicated to the second computer, to generate a model of the background at high resolution.

Thus, the (2a) a high-resolution 3D model of the object, and (4) the high-resolution model of the scene, howsoever derived, are, in consideration of (3) the selected 3D coordinate position and angular orientation of the object, into a photorealistic composite 3D image showing the object in the background.

This second, photorealistic, composite image is transmit from the second computer upon the digital communications network, and received at the first computer. It is there displayed.

This method may in particular be exercised to the purpose that a prospective purchaser of, or a designer of advertisements for, the suitably-real-world 3D object may be rendered the second, photo realistic, 3D perspective view of an object that is a virtual object. Notably, should the virtual object be made real in the world, then it would not merely suitably exist within the suitably-real-world 3D scene, but would suitably so exist as depicted in the second, photorealistic, composite image.

In details of the method, the rendering at the first computer of the first 3D composite image may be from (1) a small 3D model of a background derived at the first computer, but is more preferably derived from (1) a small 3D model of a background received upon the communications network from the second computer.

This (2) small 3D model of a selected suitably-real-world object received upon the communications network from the second computer may in particular be of an object offered for sale.

6. A Computerized Method of Generating and Rendering Over a Digital Communications Network a Perspective View of a Three-dimensional Object that can Exist in the Real World Located Within a Three-dimensional Space that can also Exist in the Real World In yet another of its aspects, the present invention is embodied in a computerized method of generating and rendering over a digital communications network a perspective view of (i) a three-dimensional object that can exist in the real world located within (ii) a three-dimensional space that can also exist in the real world.

In this method of presenting a perspective image of a 3D object in a 3D space a client computer upon a digital communications network generates (1) one or more 3D models representing one or more associated suitably-real-world objects, (2) a model of a 3D scene in which 3D scene the suitably-real-world objects can exist, (3) associated dimensional information of the particular one or more objects, and of the 3D scene, (4) associated placement and rotational information regarding where and at what positional attitude the one or more objects are placed within the 3D scene, and, optionally but usefully, (5) associated lighting information.

All this information (1)-(5) is transmitted from the first computer upon the digital communications network to another, second, computer also upon the digital communications network.

Selection is made in the second computer in accordance with at least the information (1) of (1a) a photographically or virtually derived 3D detailed model of the one or more objects.

From this information (1a), and also information (2) and extensions thereof, (3) and extensions thereof, (4) and extensions thereof, and (5) and extensions thereof, a (6) 3D perspective view of the one or more 3D objects properly scaled, located, oriented and illuminated within the 3D scene is rendered in the second computer.

This (6) 3D perspective view is transmitted from the second computer upon the digital communications network to the first computer, and is there displayed.

The entire method may particularly be exercised to the purpose that a prospective purchaser of one or more of the one or more suitably-real-world objects may be rendered the (5) 3D perspective view where at least one of the one or more objects is virtual, and only might suitably exist within the suitably-real-world scene. Accordingly, and even though at least one object shown in the (5) 3D perspective view is virtual and does not actually exist, the object both (i) could exist, and (ii) could exist as so shown within the (6) 3D perspective view.

7. A Computerized Method of Producing a High Resolution Photorealistic 3D Image on and Between at Least Two Computers Communicating Over a Digital Communications Network In yet another of its aspects, the present invention is embodied in a computerized method of producing a high resolution photorealistic 3D image on and between at least two computers communicating over a digital communications network.

In the method a server computer provides across a digital communications network to a client computer (i) a catalog of small, low-resolution, 3D graphics models of objects and (ii) a model least one scene in which the objects may exist.

The object models are commonly derived from scanning real objects, and, with human intervention, reducing the resulting image cloud to a usable digital 3D computer model. The object models may alternatively be derived from a series of photographs, again with human intervention. Still yet another origin of models is Computer Aided Design (CAD) processes to assemble geometric primitives into usable models.

The scene model may likewise be derived from photographs, or built by a CAD process, or by application of an algorithm to user-supplied dimensions and other specifications of a room (in the substantial shape of a parallelipiped body) or other environment. All this modeling is done with commercially available software and hardware. In the present invention the term "model" should be broadly construed, and will be understood to include digital models derived by diverse methods.

The client computer selects one or more objects from the catalog, and specifies at least one scene.

These selections and specifications are communicated from the client computer across the communications network to the server computer.

Responsively to receipt of the selections and specifications, the server computer provides across the communications network to the client computer a set of at least the associated small, low-resolution 3D models.

The models are manually manipulated at the client computer to derive spatial (i) positions and orientations of a selected one or more object models from the set of models (ii) within a scene of the at least one scene model. To do so is facilitated by rendering at the client computer from all object and scene models, a first, rudimentary, low-resolution 3D image of the one or more selected objects in the at least one scene, this low-resolution 3D image being used as a preview.

The positional placements and orientations of each of the selected and manipulated one or more objects in the scene are then communicated from the client computer across the communications network to the sever computer.

From these received positional placements and orientations of the selected one or more objects, the server computer renders from associated large high-resolution 3D models of the selected one or more objects and of the scene, a photorealistic, 3D high-resolution composite image of the selected one or more objects located and oriented in the scene.

This photorealistic, 3D high-resolution composite image is then communicated from the sever computer upon the digital communications network to the client computer, where it is displayed.

The photorealistically-rendered 3D high-resolution composite image may in particular be suitable to serve as advertising copy, meaning in that it is devoid of clearly visible defects.

Clearly by this method an originator of the composition of this photorealistically-rendered 3D high-resolution composite image performing selections and manipulations at the client computer need not have to, and did not, attend to the rendering, which transpired in the graphics computer. Neither did the client computer (or a human user thereof) have to create the texture applied to the models, or the models themselves.

8. A Method of Rendering at High Resolution a Photorealistic 3D Image as a Business Service on a Digital Communications Network, the High Resolution Photorealistic 3D Image Rendering Business Service In still yet another of its aspects, the present invention is embodied in a method of rendering at high resolution a photorealistic 3D image as a business service on a digital communications network.

The high resolution photorealistic 3D image rendering business service starts with providing from a server computer across the digital communications network to a client computer a catalog of small, low-resolution, 3D graphics models of at least (i) objects and (ii) scenes in which the objects may exist. Such a scene may be, and commonly is, generated from user specifications.

The identities of at least one object selected from the catalog, and at least one specified scene, and further information as to where and at what orientations selected identified objects are to be placed and oriented in the specified scene, are received oat the server computer upon the digital communications network from the client computer.

Responsively to received information and further information, the server computer renders from associated large high-resolution 3D models of each selected object and also of the scene, a photorealistic, 3D high-resolution composite image of each selected objects located and oriented in the scene.

This rendered scene is then communicated from the sever computer upon the digital communications network to the client computer.

Clearly the client computer is thus provided with a photorealistically-rendered 3D high-resolution composite image without necessity of rendering this image itself.

9. A Method by Which a Networked Client Computer may Bootstrap Itself to Production of a High Resolution Photorealistic 3D Image In still yet another of its aspects, the present invention is embodied in a method performed by (i) a relatively simple client computer running relatively simple software (ii) connected upon a digital communications network to (iii) a relatively powerful graphics server computer running relatively sophisticated graphics image rendering software, of deriving at the client computer a high-resolution photorealistic 3D image as is a typical product of the graphics server computer and beyond the capabilities of the client computer and software operating therein. By this method a networked client computer may "bootstrap" itself to production of a high resolution photorealistic 3D image.

In the method the client computer receives from the graphics server computer across the digital communications network a catalog of small, low-resolution, 3D graphics models that may be downloaded from the server computer for selected (i) objects and (ii) specified scenes in which the objects may exist.

The client computer selects objects from the catalog, and specifies at least one scene; communicates these selections and specifications to the server computer; and then downloads the selected object and scene models from the server computer across the communications network.

The client computer then manipulates the received models to derived spatial positions and orientations of objects within a scene model, and communicates these object positional placements and orientations across the communications network to the graphics server computer.

Finally the client computer (1) receives back from the graphics server computer upon the digital communications network a 3D high-resolution composite image of the objects in the scene, which image photorealistically-rendered by the graphics server computer from (i) the received object positional placements and orientations, and (ii) associated large high-resolution 3D models of the objects and of the scene, and (2) displays this photorealistically-rendered 3D high-resolution composite image.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow:

FIG. 7b is a diagram of a simulated screen view, similar to FIG. 6b, that is a photorealistic rendering of the chair previously seen in FIG. 7a.

DESCRIPTION OF THE PREFERRED EMBODIMENT

Figure 1A:
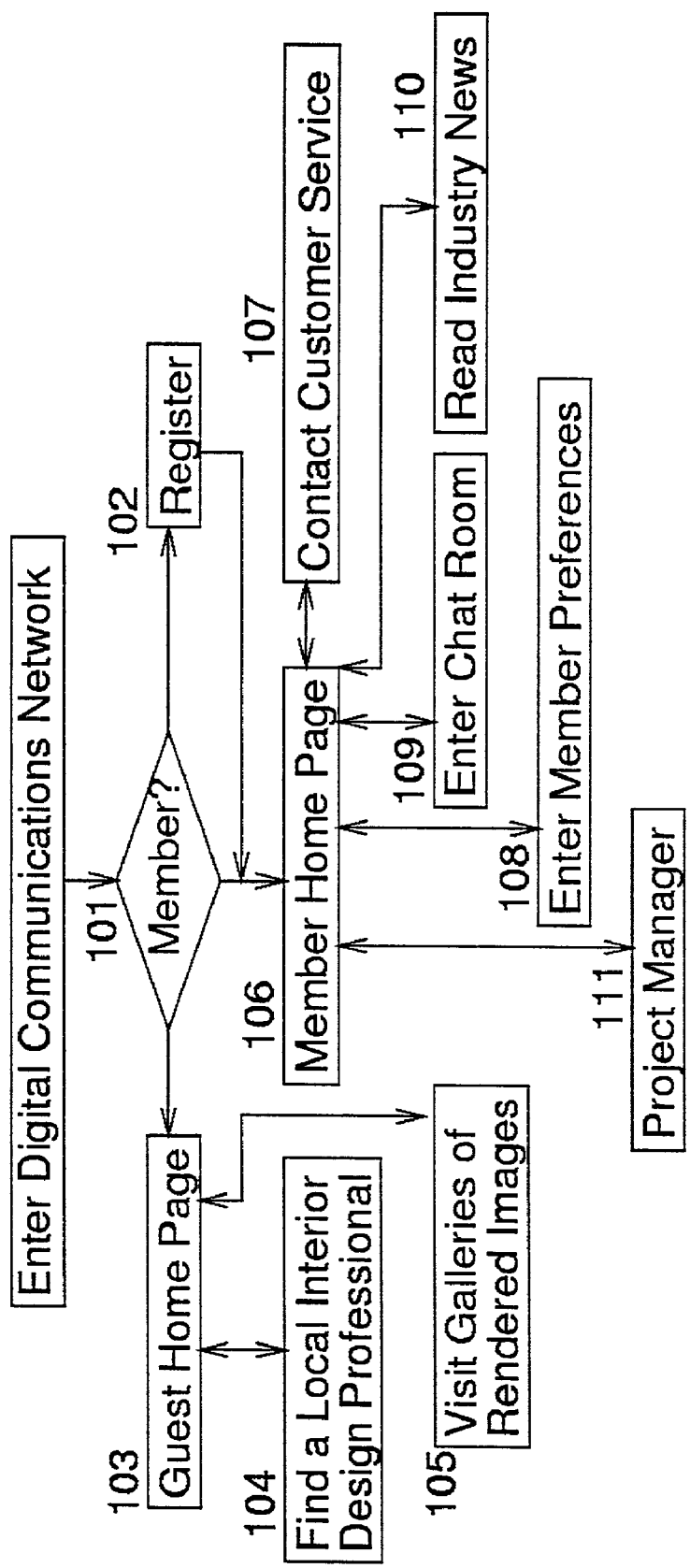
FIG. 1, consisting of FIGS. 1a and 1b, shows a high-level flow chart of the interactive method of a representative embodiment of the present invention for computerized composition and display of perspective images of real or virtual three-dimensional objects located in, surrounding or in front of real or virtual three-dimensional scenes, particularly images of the interior decor of rooms.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

1. Application and Benefits of the Present Invention

In accordance with the present invention, a business based on provision of scene composition services and/or scenes and/or product images is a sort of Internet-accessible computerized graphics service provider. However, it must be emphasized that the preferred business model of the present invention is preferably not based on selling scene composition and imaging services to consumers, but rather on providing these valuable and useful services to businesses that employ scene image designers—whether these scene designers are, for example, interior designers/furniture sales associates or advertising designers—in order that the objects selected for inclusion in the scene—such as furniture or cameras—may ultimately be sold. The image designers benefit from their participation in the interactive scene design in that they are able to better show the products to their customers, concluding sales more rapidly and efficiently with greater customer satisfaction.

The present invention is intended for application in a business-to-business electronic marketplace (e-marketplace). It is primarily directed to interactively promoting products of visually attractive design. Although usable by diverse businesses, the present invention is contemplated to be of greatest value to large multi-store retail chains, and specialized business-to-business e-marketplaces, where products like furnishings and art work can be visually selected, customized and evaluated in context The technology of the present invention permits products, such as furnishings in a luxury residence or corporate office, to be manipulated as to rotation and position, and displayed in scenes derived from customer-supplied photographs, CAD sources or specifications. Displayed products can then be simply and collectively procured, eliminating the common errors and expense associated with complex multi-manufacturer procurement over phone and facsimile.

In greater detail, the primary applications of the present invention are presently seen as (i) the merchandising of furnishings, and (ii) the development of images for advertising. For example, an advertising agency can use the system of the present invention for creating still or moving images of a product (like a consumer camcorder) in a scene of the creator's(s') choosing limited only by the creator's(s') imagination—instead of hiring a photographer and doing location shoots or building sets to accomplish the same purpose. For example, an ad agency would use the graphics modeling and image rendering service contemplated by the present invention to be done by a central provider/server to build/have built a pair of 3-D models of the camcorder (both high and low resolution), and a pair (both high and low resolution), and also 3-D models and textures of a background scene. The background scene could be derived, in whole or in part, from photographs.

Then, using only a PC with a Web browser connected to the Internet, the advertisement creator(s) would create either (i) still images of the product, or (ii) a series of still images as a motion picture—all for advertising. This permits ad agency and creative personnel to personally envision, create and manipulate the scenes to get the angles and lighting that they want, without involving a crew of photographic professionals. The results would be indistinguishable from those obtained through photographic techniques, but can be obtained at considerably less cost and with greater artistic control.

Flights of fancy can be economically indulged. For example, gravity could be defied. All of this can be accomplished today with available, albeit sophisticated, computer hardware and software—but only by highly skilled specialists. These specialists are eliminated, or at least centralized and substantially divorced from any concurrent creative requirement, by the system of the present invention. Advertising agency "creative" people without training computer graphics skills could create the exact images they desire, once, in accordance with the present invention, necessary models and scenes have been created and loaded onto a central server.

In the creation of images for advertising application, a series of images in the form of a moving picture may be (over time) sent back over the network from the server—a succession of digital video files. Furthermore, a customer may envision, create (have created), and subsequently use not only object models, but background scene models.

1.1 Application and Benefits of the Present Invention to Interior Design

In one embodiment the present invention may be used by interior design professionals. This large wholesale market is ideally suited to web-based intermediation because: 1) both buyers (designers) and sellers (manufacturers and distributors) are fragmented; 2) nearly all mid- to high-end furniture products are highly customized and therefore made-to-order (minimizing the need for inventory); and, 3) given the state of year 2000 digital network infrastructure, the proposed business can only exist on the web, and requires specialized and proprietary visualization technology.

The web-based application and tool of the present invention permits designers and their clients to select, customize and rearrange groupings of furnishings to see how they will look within the client's actual room. The complete system and tool of the present invention includes each of (i) a large on-line catalog containing 2D images and information for textures and furnishings, which may include fabric, wallpaper, paint colors and finishes, wood finishes upholstered furniture, case goods, art, art objects and decorative accessories, (ii) a library of stock 3D room models that may be interactively sized, an interactive 3D room model generator containing a floor plan tool, and (iii) a library of proprietary 3D furnishings models.

By manipulating designer-supplied CAD drawings or photographic images of actual rooms with the software tool of the present invention, designers will be able to simply and quickly produce photo-realistic images of their vision. Features including lighting effects and highly detailed models of furnishings permit the rendered, composite images to appear photo-realistic. While design professionals will occasionally build or render their own models, such projects are very time consuming, and require hours of rendering time on personal computers. The interactive, real-time visualization of an entire room of furnishings, wall and floor coverings, art objects and accessories accorded by the system and method of the present invention is not otherwise, to the best knowledge of the inventors, currently available anywhere (circa 2000).

In use of the system and method of the present invention interior designer and architect members will (1) research, (2) design, (3) render, (4) market, (5) sell and (6) manage.

To (1) research, interior designer and architect members will (i) identify and examine product offerings and customization options; (ii) utilize zoom technology to examine high-resolution product photos in great detail, (iii) utilize a large on-site reference library of searchable room images, (iv) participate in surveys, chat sessions and obtain confidential and anonymous feedback on design ideas; and (v) view industry news and views.

To (2) design, interior designer and architect members will (i) use the powerful web-based graphical user interface and visualization tools of the present invention to virtually decorate interior spaces for residential and some commercial and entertainment applications to professional standards; (ii) create a project color palette, and use it to identify fabrics, rugs, art work, accessories and wood finishes; (iii) select and then view fabrics and finishes at high magnification to see intricate detail by utilizing zoom technology; (iv) apply a large selection of fine fabrics and finishes to intricate 3D models of furniture, pillows and cushions to create a composite image of the room being decorated, all by use of a simple graphical user interface (v) order swatches, and (vi) design and "see" private-label high-end custom cabinets and entertainment centers in various sizes, configurations, styles, veneers and finishes.

To (3) render, interior designer and architect members will (i) specify lighting, camera position and other rendering options; (ii) create photo-realistic renderings of their designs which incorporate photographs or CAD drawings of the actual rooms being decorated; and (iii) order large high-resolution image files or color prints of the photo-realistic renderings produced on the web site of the imaging service provider.

To (4) market, interior designer and architect members will, by use of a password-protected private gallery, showcase renderings of completed projects to prospective clients. A zoom tool will be available here as well, to aid viewers in examining areas of the image they wish to view in greater detail.

To (5) sell, interior designer and architect members will show quality screens and prints of proposed designs to their clients to help these clients "see" how their rooms will look with new furnishings, thereby helping these interior designers and architect members to win client approval to proceed with high-budget projects.

To (6) manage: interior designer and architect members will (i) generate project budgets, track purchase orders, delivery schedules and generate client invoices; (ii) order customized products showcased on the site, including furniture, rugs, wall paper and accessories.

In addition, dealers and manufacturers represented on the web site will be able to test market product designs, gather market data and provide static or interactive advertising to targeted buyers. They will also benefit from the automation inherent in the research, procurement and related systems.

The web site of the imaging service provider will also provide personalized industry community and content. This fully integrated platform will empower interior designers and architects with unprecedented visualization and communication tools, while simultaneously supporting all critical back-office functions. Thus the present invention supports operation of a service business, while outsourcing manufacturing.

It is expected that use of the imaging of the present invention at an associated imaging services web site will significantly improve the productivity of interior design professionals. The imaging services site is intended to be a one stop project management and purchasing system which will improve client communications, and save designers considerable time in identifying sources, selecting and specifying products, developing and communicating designs, obtaining fabric samples, and managing the vendor relationship and procurement process.

1.2 Application and Benefits of the Present Invention to the Display of Art Work In another embodiment the present invention may be used by makers and sellers of fine art. Art work of all kinds, including sculpture, paintings, picture frames, lamps and accessories may usefully be visually evaluated in the context of other furnishings, art work and architecture. This the present invention provides.

2. General Description of Application of the Present Invention to Interior Decoration The present invention contemplates both (i) a business method of supporting design professionals including manufacturers and representatives, and particularly interior designers and decorators, in the realistic visual display of both real and virtual images of complex three-dimensional objects, particularly wall and floor coverings, art work, lighting fixtures, decor accessories, building products and furniture (herein collectively referred to as "furniture" or "furnishings" in the context of rooms both real and virtual, to the ends of assisting the designer identify, specify and procure products and develop a pleasing design; and of permitting client viewing and endorsement of the interior designs and of rooms themselves as in the case where a home purchase is contemplated, and (ii) an improved three-dimensional image composition, display and procurement system and method, especially as serves to display the decorated rooms of buildings, especially as such furnished room images are created by professional interior designers. The image creation transpires interactively, on a digital communications network.

The visualization method of the present invention is distinguished in that it allows the compositing of precisely-placed, rotated and manipulated (such as, for example, colored or "upholstered") 3D objects of specific size into photographically-derived background scenes at their proper scale over a digital network. Products such as Photo Home Interiors™ also allow the compositing of 3D objects into photographically-derived backgrounds, but not with precise placement, or at the proper scale, or over a digital network. Such images are rendered in 3D and built from 3D objects that are each (i) chosen, (ii) placed, (iii) oriented and (iv) manipulated while in a two dimensional form. This approach is used by programs such as by the Sierra Home Architect 3.0 (a component of Custom Home 3D Design and Décor), for objects projected onto virtually-derived backgrounds. However, this program does not support photographically-derived background scenes—it is basically a CAD program. Choice, placement, orientation and manipulation of the two dimensional images is commonly performed, by way of example, by an interior designer. Although the designer uses his or her skill in each of the selection, three-dimensional placement and orientation, and manipulation of items (typically floor and wall coverings, art work and furniture) in the room, the designer need not be concerned with any three-dimensional, wire frame models of the images, nor with any of the mechanics of rendering the scene of the furnished room in three dimensions. Accordingly, the designer remains such, and is not forced to become a 3D computer graphics engineer to use the system, and the method, of the present invention.

Nonetheless to be assembled with but a modicum of computer graphics skills by using a mouse to point, manipulate and select attributes of simple 2-D images, the 3-D images produced by the present invention are of high quality. Complex 3D objects such as pieces of furniture appear in the room images adjusted in location, size, angular rotation as these objects would actually appear within the 3D volume of an actual room. Even the orientation and scale of fabric coverings, as well as selectable colors, are true to reality. Light ray tracing is preferably performed from actual outdoor and indoor sources of light into, and in, the room. The resulting composite, virtual reality, image is very much like a quality photograph of, typically, a decorated room, and more typically an expensive and elegantly-decorated room as might commonly be within a luxury private home or mansion. Nonetheless that the image looks completely "real", it may show objects, most commonly custom furniture, within rooms that may or may not yet be built, or at least are not yet lighted as within the computer-generated image.

The powerful imaging of the present invention is coupled to the service of a new method of doing business: a method of researching, promoting and procuring products represented by 3D objects (including objects not yet existing) by accurately depicting these objects in the context of their actual sites (background scenes) and actual use. The imaging process is interactive. Most commonly, a professional interior designer (1) will choose, create or provide a two-dimensional (2D) floor plan representation of a room, and (2) will access it across the world wide web along with a proprietary database of two-dimensional images (and invisibly associated 3D models) of furniture, including large amounts of custom furniture that is yet to be fabricated. If provided, the (1) 2D room images may be of (1a) a real room, provided as a set of two or more digital photographs taken from different angles with commonly-identifiable points such that a computer may determine the camera positions and recognize the perspective on, and dimensions of, the room, or (1b) a virtual room, such as can be provided from a CAD/CAM program.

In the (1b) case, the designer provides some simple information about the selected virtual room image, such as the dimensions of the room, the 3D location from which the room is to be viewed (the eye, or camera, location), and the source(s) and type(s) of illumination desired for the rendered room image.

The designer may enhance and customize portions of the rendered room image, such as by virtually hanging 2D pictures or wallpaper, or inserting 2D windows or doors, by making alterations to a 2D representation of the 3D room model, such as a floor plan. Similarly, the designer chooses 2D images of, inter alia, furniture, (i) placing 2D iconic representations of these images into appropriate points within the room with mouse clicks, and then (ii) indicating the desired three-dimensional rotational orientation of the real (3D) items associated with the 2D icons so placed. The designer runs a browser program at a client computer so as to interact across the world wide web with a software program operating on a server to, eventually, produce a 2D composite rendered image of the room.

In greater detail, the designer clicks on an icon, which is most normally a small eye-level front-view picture, of a selected item of, typically, furniture, and then clicks on a desired location within a floor plan or other schematic representation of a room image. This process generates top-view icons that are automatically sized to the scale of the floor plan. Normally only two room coordinates need be specified, the computer knowing from the icon (of a chair, or table, etc.) that the object is to be placed upon the room floor. The designer will preferably indicate the desired rotation of the icon. Again, only one rotational coordinate (relative to a cardinal direction of the room which is normally straight into the viewer screen) of from 0-360° is required because the computer knows from the selected icon that the object is being directionally oriented upon the floor. The end result is a 2D (floor plan) image of a room in which are placed properly sized and oriented 2D (top view iconic) images of furniture. Although the image is rather flat and lifeless—much like paper clothes might be pinned on paper dolls—and a top view iconic image of, for example, a chair oriented to face away from the viewer is most certainly not the same as an image of the back of the chair, the image is useful in evaluating the placement and orientation of the furniture represented by the icons.

Then, in accordance with the present invention, the designer can and will direct that the entire room image, including all contents, be rendered in three dimensions. This 3D image rendering is, in accordance with the present invention, performed by an image graphics program that is most typically run in a powerful computer, and even then most typically over a period of up to several minutes. The resulting image rendering is, however, very useful in supporting the interior design process. Furthermore, because (i) complete and proper dimensional information for the room is provided by the designer/user and is incorporated within the 3D models of the placed objects (the furniture), because (ii) simple rules—such as that furniture should sit upon the floor—are adhered to in the image rendering process, and because (iii) realistic scene illumination is provided by rendering methods such as ray tracing, the rendered 3D image is of high quality, resembling a large color photograph of a completely realistic room.

The designer normally then seeks approval of his or her design vision by having his or her client view this generated image, iteratively making such changes and regenerating the image as proves necessary.

When the interior design of the room is both complete and agreed upon by the interior designer's client, the designer will typically place an order with the image generation service for some or all of the items—most commonly furniture—depicted with the 3D image. The image generation service is thus directly making money for the provider of the service as a wholesaler, manufacturer's representative or jobber, of furnishings and building products like tile or wall paper, or as an agent for artists creating custom furnishings or accessories.

The interior designer may pay a small charge for image rendering services provided, but this charge is typically either de minimis or foregone entirely if and when the designer places orders with the image generation service for the delivery of furniture. In accordance with the present invention, facilitating the sale of furniture is the primary source of revenue to the image generation, promotion and procurement service. The image generation service may also charge furniture manufacturers a nominal fee to create and display images of the manufacturer's furniture—especially if furniture of the manufacturer seldom or never sells—but the primary net revenue derived by the promotion, procurement and image generation service stems from the placing and taking of orders for furniture, and to the lodging of these orders with the manufacturers (if the manufacturer is not an affiliate of the image generation service) for direct or indirect shipment to purchaser. The concept of maintaining profitable relationships with both customers—who desire to buy prudently—and with suppliers—who desire to sell as much as impossible—may be compared to the profit model of the modern supermarket chain where revenues are derived from both customers and suppliers (although the furnishings are orders of magnitude more expensive than food).

The present invention still further contemplates interactive advertising. Name, the advertising consists of delivering to a prospective customer of some customer-selected product a virtual image of the product located within virtual scene, the virtual scene permissively including still other virtual objects. In this manner the prospective purchaser of almost anything may view the object of his/her contemplated purchase in the environment of the prospective purchaser's choice.

3. General Theory and Practice of the Invention 3.1 Image Compositing and Rendering, Including of Virtual Objects Interactively Over a Communications Net The technical method of the present invention is directed to the compositing of precisely-placed, rotated three dimensional ("3D") objects of known size into photographically- or virtually-derived background scenes. To achieve this objective, a specialized rendering and compositing methodology was developed. In the case of photographically-derived background scenes, two or more photographs of the desired background scene, taken from different angles, are obtained. The background scene may be, for example, an interior room, or an exterior space, or even a human head.

Portions of the scene that are desirably preserved in an eventual scene rendering are selected and then removed or "cutout" from the scene using standard image editing software. Then, a 3-D model of the altered background scene is created from the multiple images using commercially available software. This involves identifying common points in each of the photographs, and the distance between two points. These positions allow the precise camera location for each image to be calculated, lens distortion to be reduced, and scale and an X-Y-Z coordinate system to be established. For example, for a scene of an interior room geometric primitives are overlaid onto each wall, floor and ceiling surface, including soffits and recesses.

Next, scene objects—like furniture such as chairs and furnishing such as rugs and wallpaper and paintings—that are suitably incorporated in the respective scenes are selected from stock catalogs of these objects by a designer/selector. For both photographically-derived and virtually-derived background scenes, these objects—for example furnishing objects like sofas—are then placed into the 3D model depicting the background scene. All objects are placed and oriented where and as desired in the scene, and all desired surface coloration, textures, shadings, etc. are applied.

Finally, a composite rendering is produced using proprietary software. The rendering projects the background scene and all objects therein in their proper or desired position, replete with lighting effects and shadows. Cutout objects are also included for photographically-derived scenes, as well as the background scene of one of the multiple images.

As previously explained, the synthesized scene can potentially be, if desired, so realistic that it cannot be distinguished from reality save by a trained forensic "photo" analyst. However, the normal mode of the composite image rendering of the present invention is to make a geometrically spatially accurate perspective image, but not one so detailed and isotopically brightly lit so as to be suggestive of a picture of a laboratory, or of a criminal mugshot. Modern graphic imaging techniques readily permit making images less harsh and more subdued, and such techniques are used in the system of the present invention to good effect in accordance that no prospective purchaser of luxury goods should be too harshly confronted with the (visual) limitations of his or her purchase, or, worse yet, of his or her home, or, still worse yet, of himself or herself.

In summary, a system is presented that allows customized virtual objects of known size to be interactively manipulated and placed into precise locations of photographically or virtually-derived scenes at the proper scale, over a digital network. Such "in context" interactive product displays are useful for evaluating visually attractive design concepts, and for product promotion and procurement. For example, existing and to-be-constructed rooms in both residential and commercial buildings, such as might be designed by professional interior designers, are proper subjects for the display system of the present invention. For example, the showing of virtual images of a motor vehicle located in a landscape is a proper subject for the display system of the present invention.

3.2 A Method of Visually Presenting an Object Suitably Existing Within the Real World within a Scene Suitably Existing Within the Real World Therefore, in one of its aspects the present invention is embodied in a method of statically visually presenting an object suitably existing within the real world within a scene suitably existing within the real world.

The method combines both (i) a selected 2D image representing an associated real-world scene in which the suitably real-world object can exist, and (ii) a selected name, or, preferably, a 2D icon representing the suitably-real-world object, the 2D icon appropriately sized to, and selectively located and aligned within, the 2D representation of the selected real-world scene, with (iii) a (generated) 3D model of the represented selected real-world scene, (iv) a 3D model of the iconically represented suitably-real-world object, and (v) object-based rules as to how the suitably-real-world object exists within the real-world scene, in order to generate (vi) a perspective view of the suitably-reals-world object properly located and oriented within the real-world scene.

Thus selection of each of an icon, a 2D image of a real-world scene, and an icon location within the selected scene image, permits combining a 3D model of the real-world scene with yet another 3D model of the suitably-real-world object represented by the selected icon so as to generate a static perspective view of the selected suitably-real-world object located within the selected real-world scene.

More simply put, image selection(s) transpiring entirely in 2D supports generation of a (static) perspective view showing a 3D object within a 3D scene. Furthermore, the present invention allows this to happen with photographically-derived, as well as virtually-derived, scenes.

The method is preferably exercised to the purpose that a prospective purchaser of the real-world object may be rendered a perspective view of the object within a real-world scene in which real-world scene the object can actually exist. Still more preferably, the rendered perspective view may be of furniture, and furnishings, within a room.

In the case of a room image, the combining is then of (i) a selected 2D image representing a room, and (ii) a selected 2D icon representing a room furnishing, with (iii) a 3D model of the room, (iv) a 3D model of the furnishing, and (v) object-based rules that the furnishing is upon a floor or a wall of the room, in order to generate (vi) a perspective view of the room furnishing properly located and oriented within the room. By exercise of this method a prospective purchaser of the real-world room furnishing may be rendered a perspective view of a suitably-real-world room furnishing properly located and oriented within a real-world room.

The suitably-real-world room furnishing rendered in perspective view may already exist in the world, and can thus be ordered by the prospective purchaser. However, the depicted furnishing may not yet exist in the world, existing only in virtual reality, and must therefore be built if and when ordered by the prospective purchaser.

The positioning of objects within the scene is by combination of "click and drag" to move an icon (which icon may itself be a very small 3D picture) into a scene, and by then manipulating in spatial position, and in angular orientation, a small, low-resolution, 3D model then appearing within the scene. Other variations are possible, it being understood that the following claims of the present invention set forth the general steps of the invention for the interactive selection, and generation, of most images, including preferred step-by-step procedures for realizing preferred images of furnished rooms. It is, however, possible to vary from the detail steps of some, or of all, claims without departing from the spirit of the present invention. Such is the case where (i) a low-resolution 3D model, such as of furniture, moved into a scene, such as of a room, in order to make a low-resolution 3D perspective image in which scene the furniture exhibits proper placement, is alternatively equivalently replaced by (ii) a selected low-resolution "stick figure" model, such as of the same piece of furniture only now in outline and without surfaces nor surface textures, combined with a low-resolution 3D model of the scene so as to make a combined perspective scene view in which the object (the piece of furniture) exhibits proper placement and orientation nonetheless to being in "stick figure" form. Indeed, a single 3d perspective scene view may incorporate both (i) low-resolution 3D volume models, and (ii) low resolution stick figure models, as is seen in the examples of the drawings. A practitioner of the imaging arts will recognize the essential equivalence of these processes, mutatis mutandis.

By this imaging a prospective purchaser of the real-world furniture and furnishings—no matter how crudely initially depicted—may be ultimately rendered a high-resolution 3D perspective view of the furniture and the furnishings properly positioned, and oriented, within the scene of the purchaser's own choosing. As always, the suitably-real-world objects rendered in perspective view may already exist in the real world, and can be immediately shipped to a prospective purchaser. However, it is also possible that the suitably-real-world objects rendered first in low resolution, and ultimately at high resolution, in 3D perspective view do not yet exist in the real world, and must be custom built when ordered by the prospective purchaser. The objects are thus "virtual", and are based on digital models.

3.3 An Interactive Method of Promoting and Selling Real-World Objects

In another of its aspects the present invention is embodied in a method of doing business: an interactive method of promoting and selling real-world objects.

A principle variant of the preferred method commences by originating at a server upon a digital communications network (1) a first plurality of 2D images depicting real-world scenes, (2) a second plurality of 2D images depicting real-world objects, (3) a third plurality of icons corresponding to the second plurality of images depicting real-world objects, (4) a fourth plurality of 3D models corresponding to the scenes that are depicted within first plurality of 2D images of real-world scenes, (5) a fifth plurality of 3D models corresponding to the objects that are depicted within second plurality of 2D images of real-world objects, and (6) a sixth plurality of object-based rules.

Selected members of each of the (1) first plurality of 2D images of real-world scenes, the (2) second plurality of 2D images of real-world objects, and the (3) third plurality of icons corresponding to the second plurality of images of real-world objects are first-communicated from the server upon a digital communications network to a client.

The client selects a (1a) selected real-world 2D scene image from among the (1) first plurality of images, and a (3a) selected icon from among the (3) third plurality of icons which (3a) selected icon does correspond to a (2a) selected real-world object image from among the (2) second plurality of real-world object images.

The (3a) selected icon within the (1a) selected real-world 2D scene image is sized and placed at the client's computer by operation of a computer program.

This sized and placed (3a) selected icon within the (1a) selected real-world 2D scene image is second-communicated from the client upon the digital communications network to the server.

The server selects under program control from among the (4) fourth plurality of 3D models a (4a) 3D model of the real-world scene corresponding to the (1a) selected real-world 2D scene image, and from the (5) fifth plurality of 3D models a (5a) 3D model of the real-world object.

The server then generates from the (4a) 3D model of the real-world scene, the (5a) 3D model of the real-world object and the (6) plurality of object-based rules, a (7) static perspective view of a (7a) 3D real-world object corresponding to the (3a) selected icon properly located and oriented within a (7b) 3D real-world scene corresponding to the (1a) selected real-world 2D scene image.

Next, the server third-communicates this generated (7) static perspective view upon the digital communications network to the client. By and from this third-communicated (7) static perspective view, the (7a) 3D real-world object properly located and oriented within the (7b) 3D real-world scene may be observed at the client.

The client fourth-communicates upon the digital communications network to the server a sales order, lodging with the server an order to physically provide a real specimen of the (7a) 3D real-world object. Obtaining the sales order for the (7a) 3D real-world object is thus promoted by showing the (7) static perspective view at the client, which static perspective view contained the (7a) 3D real-world object properly located and oriented within the (7b) 3D real-world scene.

In its preferred application, this interactive method of the present invention is exercised for selling real-world objects.

For example, room furnishings and furniture may be imaged and advertised and/or sold. In this application the server originates (1) a first plurality of 2D images depicting rooms, (2) a second plurality of 2D images depicting furnishings, (3) a third plurality of icons corresponding to the second plurality of furnishing images, (4) a fourth plurality of 3D models corresponding to the rooms that are depicted within first plurality of 2D room images, (5) a fifth plurality of 3D models corresponding to the furnishings that are depicted within second plurality of 2D furnishing images, and (6) a sixth plurality of rules regarding how furnishings fit within rooms. In this application the server first-communicates upon the digital communications network to the client selected members of each of the (1) first plurality of 2D room images, the (2) second plurality of 2D furnishing images, and the (3) third plurality of furnishings icons.

In this application the client selects a (1a) selected real-world 2D room image from among the (1) first plurality of room images, and a (3a) selected furnishing icon from among the (3) third plurality of furnishing icons, which (3a) selected furnishing icon does correspond to a (2a) selected furnishing image from among the (2) second plurality of furnishing images. The (3a) selected furnishing icon within the (1a) selected 2D room image is sized and placed at the client.

The client second communicates to the server upon the digital communications network the sized and placed (3a) selected furnishing icon within the (1a) selected 2D room image. The server selects from among the (4) fourth plurality of 3D models a (4a) 3D model of the room corresponding to the (1a) selected 2D room image, and from the (5) fifth plurality of 3D models a (5a) 3D model of the furnishing corresponding to the (3a) selected furnishing icon, and generates from the (4a) 3D room model, the (5a) 3D furnishing model and the (6) plurality of furnishing rules, is of a (7) static perspective view of a (7a) 3D furnishing corresponding to the (3a) selected furnishing icon properly located and oriented within a (7b) 3D room corresponding to the (1a) selected 2D room image.

Further in this application, the server third-communicates upon the digital communications network to the client the generated (7) static perspective view, and from this third-communicated (7) static perspective view the (7a) 3D furnishing properly located and oriented within the (7b) 3D room may be observed at the client.

Finally in this application, the client fourth-communicates the sales order to the server upon the digital communications network, the sales order directing physically provision of a real specimen of the (7a) 3D furnishing. Thus a sales order for the (7a) 3D furnishing has been promoted by the (7) static perspective view showing at the client the (7a) 3D furnishing properly located and oriented within the (7b) 3D room.

Typically at least one of the server's first, second and third pluralities of images is proprietary, and more typically all these first, second and third pluralities of images are proprietary.

The originating server may further offer (8) a set of available lighting effects, thus making that the first communicating from the server upon a digital communications network to the client is further of the (8) set of available lighting effects, the selecting at the client is further of a (8a) selected lighting effect from among the (8) set of lighting effects, the second communicating from the client upon the digital communications network to the server is further of the (8a) selected lighting effect, the generating at the server is further of the (7) static perspective view as illuminated by the (8a) selected lighting effect, and the third communicating from the server upon the digital communications network to the client is of the generated (7) static perspective view as illuminated by the (8a) selected lighting effect.

Likewise, the originating server may further offer of (8) a set of available textures and colors. The first communicating from the server upon a digital communications network to the client is then further of the (8) set of available textures and colors, the selecting at the client is further of a (8a) selected textures and colors from among the (8) set of textures and colors, the second communicating from the client upon the digital communications network to the server is further of the (8a) selected textures and colors, the generating at the server is further of the (7) static perspective view as textured and colored by the (8a) selected textures and colors, and the third communicating from the server upon the digital communications network to the client is of the generated (7) static perspective view as textured and colored by the (8a) selected textures and colors.

Most preferably in exercise of the interactive method for selling furnishings, the selecting, including of lighting effects and colors and textures, is performed by an interior designer at the client.

Strongly preferably in exercise of the furnishings sales method the generating produces a 3D virtual image of the room where all textures are scaled and oriented to the three-dimensional objects in which the textures appear.

This interactive method in accordance with the present invention for selling furnishings may be still further expanded in that, between the third communicating and the fourth communicating, the interior designer at the client may fifth-communicate upon the digital communications network a request for a real physical sample of something in the generated and displayed 3D image of the room with furnishings. This requested sample is normally physically providing to the interior designer to help promote the sale.

The fifth-communicated request for a physical sample may be of any of a fabric swatch, a wallpaper sample and the like.

As with the display generation method of the present invention, the (7a) 3D image may be of a furnishing that does not yet exist in the real world, and exists only in virtual reality (as designed in three dimensions by a designer). In this case after the fourth-communication of the order, a real copy of the (7a) 3D imaged furnishing which has, until acceptance of the order, never existed save as a virtual image, will be fabricated and delivered.

An analogous, and similar, application of the method of the present invention is to show an exterior space, such as a building or courtyard or yard. Note the slight differences. The model of the space that is uploaded does not define an interior space (a room) in which objects will be placed, but rather an exterior space or scene into which objects will be placed. The dimensions of this exterior space must again be communicated so as to properly show the relative sizes of objects located in the space. One effective way of communicating information regarding this space is simply to transmit at least two, and potentially many more, plan digital images ("pictures") of the space. At least one distance commonly visible in at least two images is specified. From these images, and with the identification of matching points, the software running in the server computer is able to derive key elements of a 3D model of the exterior space, including its scale.

In some variant cases, a model of a space that is uploaded does not define an interior space (a room) in which objects will be place, but rather an exterior scene—such as a patio or a driveway—within which objects will be placed. The dimensions of the model scene—interior or exterior—are important to show, among other things, the size of the depicted objects. One effective way of communicating 3-dimensional information regarding the chosen scene from the client computer, as may be for example located in the office of an interior designer, to the server computer in order that a high-resolution 3D model of the head may be either selected or custom made is simply to use a commercially-available product designed for this purpose. With information provided by such 3-dimensional model capture device, software—generally as runs in the server computer—is able to generate a properly scaled and photographically-textured 3D model of the scene using all pertinent measurements such as, for example, the dimensions of a room.

Still further, in application of the method of the present invention to the selection and imaging of objects any final image that appears unrealistic, let alone comically distorted, is not desired. The server computer software used in automated production of the image is, although substantially pre-existing, large and extensive; the computer hardware is powerful; and the accounting for image artifacts—such as reflections and bending of light by the lenses accounted for by ray tracing—extensive. The image generation process is resource intensive, but (i) the extensive server resources used to produce the image are shared (at different times) between different users, and (ii) each produced high-resolution 3D image is static. (Note however that successive static images as are assembled into a movie or other multimedia production may be compiled over time.) According to these constraints, the image is not produced in real time as might suit, for example, an animated computer game, but is of exceedingly high quality, as suits its business purpose.

4. A Method of Interactive Advertising

In still another of its aspects the present invention is embodied in a method of interactive advertising.

The method consists of delivering to a prospective customer of some customer-selected product a virtual image of the product located within virtual scene, the virtual scene permissively including still other virtual objects. This delivering arises from first-interacting upon a digital communications network between (i) a server computer having a first palette of virtual images of scenes, and a second palette of virtual images of products and objects, and (ii) a client computer where the prospective customer selects (1) a scene image from among the server computer's first palette, and also (2) at least one product image, and other object images, from the server computer's second palette. This first-interacting is so as to (i) locate the product, and object, images within the scene image, and also so as to (ii) produce at the server computer to the prospective customer an image of a customer-selected scene in which appears images of a prospective-customer-selected product and other selected objects.

The prospective customer at the client computer thus interacts upon the digital communications network and with the server computer to interactively produce a scene in which the customer-selected-product is advertised.

This method of interactive advertising may be exercised so as to deliver to the prospective customer a virtual image of a furnishing located within a virtual scene of a room, replete with virtual images of other room furnishings. In such a use the prospective customer interacts to produce a scene in which the customer-selected furnishing product is advertised.

This method of interactive advertising may be exercised so as to deliver to the prospective customer a virtual image of a tree, shrub, flower or the like, or a patio or a wall or the like, or shutters or windows or the like, or a barbecue grill, tables, or chairs or the like, located within an outdoor scene, replete with and existing landforms and improvements upon the land. In such a use the prospective customer interacts to produce a scene in which the customer-selected landscaping, and/or natural or man-made artifacts that may be introduced into the scene, are advertised.

Alternatively, the method of interactive advertising may be exercised so as to deliver to a prospective customer a virtual image of some object or objects—a motor vehicle or whatever—located within an exterior scene. Any virtual objects in the image may be accompanied by images of real objects, and any virtual scenes—such as spectacular and dramatic mountain and canyon scenes that are much in favor in television advertising circa 2002—may be accompanied by real scene images and textures, such as of forests. The prospective customer thus interacts to produce a scene in which is featured the object—a promoted product.

For example, the method of interactive advertising may be exercised so as to delivering to the prospective customer a virtual image of a vehicle located within a virtual outdoor scene, in accompaniment to virtual images of other vehicles. The prospective customer thus interacts to produce a scene in which the customer-selected vehicle product is advertised.

In any use of the method of interactive advertising, after delivery of the image the method may continue with fulfillment by making a real copy of the displayed customer-selected-product which has, until acceptance of the order, never existed save as a virtual image.

5. Detailed Description Of the Present Invention

Figure 1B:
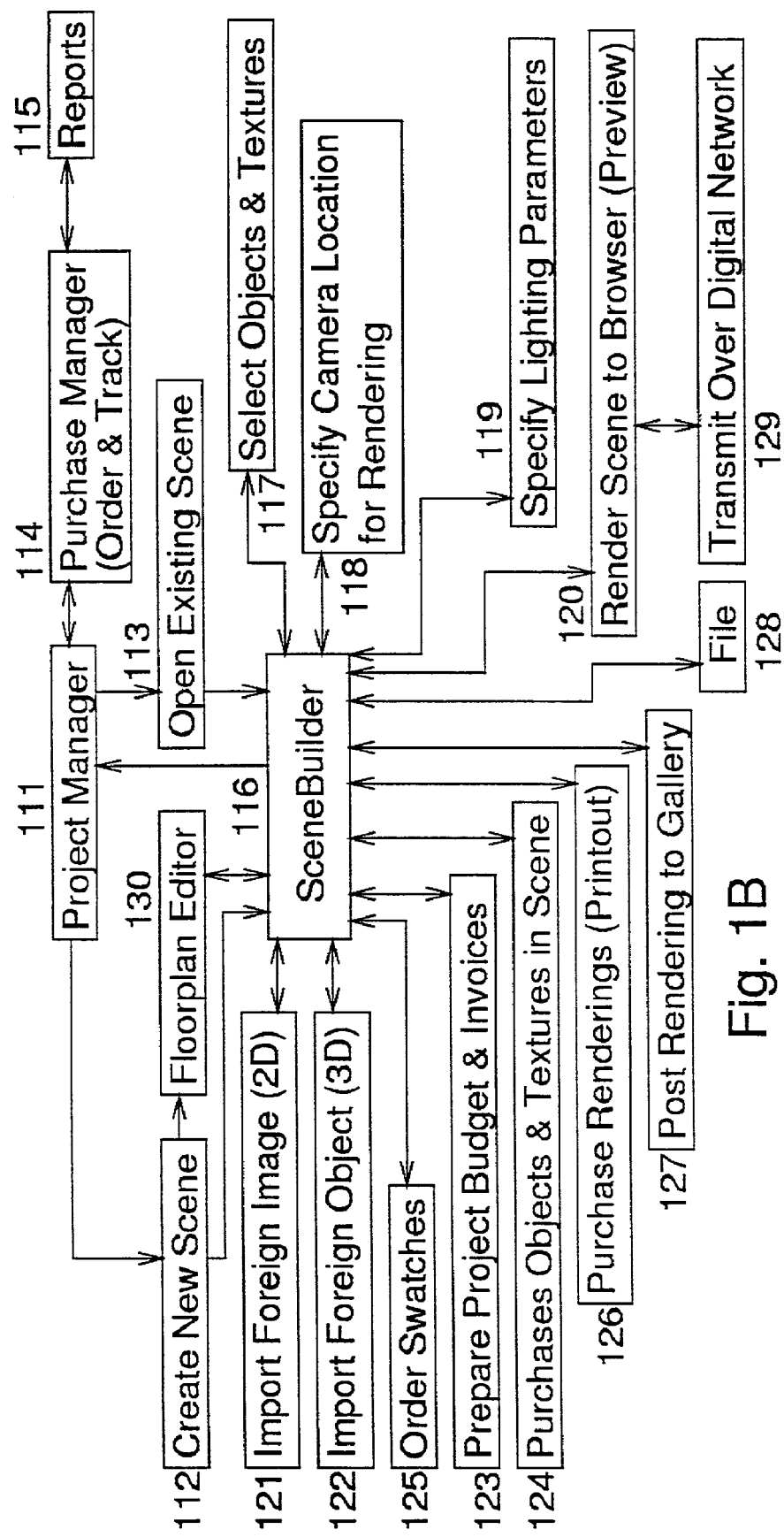

Referring now to the drawings, FIG. 1 is a flow chart illustrating information flow within a preferred embodiment of the present invention. This preferred embodiment is described in reference to a private furnishings merchandising system on the Internet. Using a Web3D browser, this system permits designer/sales associates of, for example, a major retailer, to support many aspects of their employer's business. These include identifying and selecting furnishings, creating realistic visualizations of furnished rooms, ordering swatches, preparing budgets, ordering furnishings, preparing invoices, tracking orders, staying abreast of industry news and chatting with colleagues.

Designers will be able to rapidly identify and select furnishings, place them into a 3-D perspective view or floor-plan view of a room model in the desired position along with decorative accessories, wall and floor coverings, and then rapidly render a photorealistic screen image of the completed room scene, complete with lighting effects. It will also allow new furnishing objects, including furniture upholstered in selected fabrics, wallpaper and carpet to be rendered with the proper perspective in scenes containing photographically-derived models of actual rooms. In this way, a realistic image can be created of an actual room that includes existing furnishings and architectural details, along with new furnishing objects selected by the designer. Such rendered images can then be viewed on screen, e-mailed to clients for approval, or large-scale high-resolution color prints can be ordered for use in client discussions.

After selecting furniture objects for inclusion in a particular room, they can be customized, by selecting from many different fabrics and finishes, and by specifying various design detail options. Such unique combinations may never have been built, but the system will nevertheless allow such customized products to be accurately visualized in actual room settings.

As shown in FIG. 1, the process begins with determining membership status 101. In this representative embodiment, membership will only be granted to sales associates of sponsoring employers, after they request membership, provide the necessary information, and are accepted or rejected as members 102. Non-member "guests" will have access to only limited portions of the system 103, which may include a directory of local designers 104, and a public gallery of rendered images 105.

From the Home Page 106, Members will contact customer service 107, enter member preferences 108, enter the chat room 109, read industry news 110, and utilize the Project Manager 111 to create a new room scene 112, open an existing room scene 113, or order and track purchases 114 and print project tracking reports 115.

Figure 2:
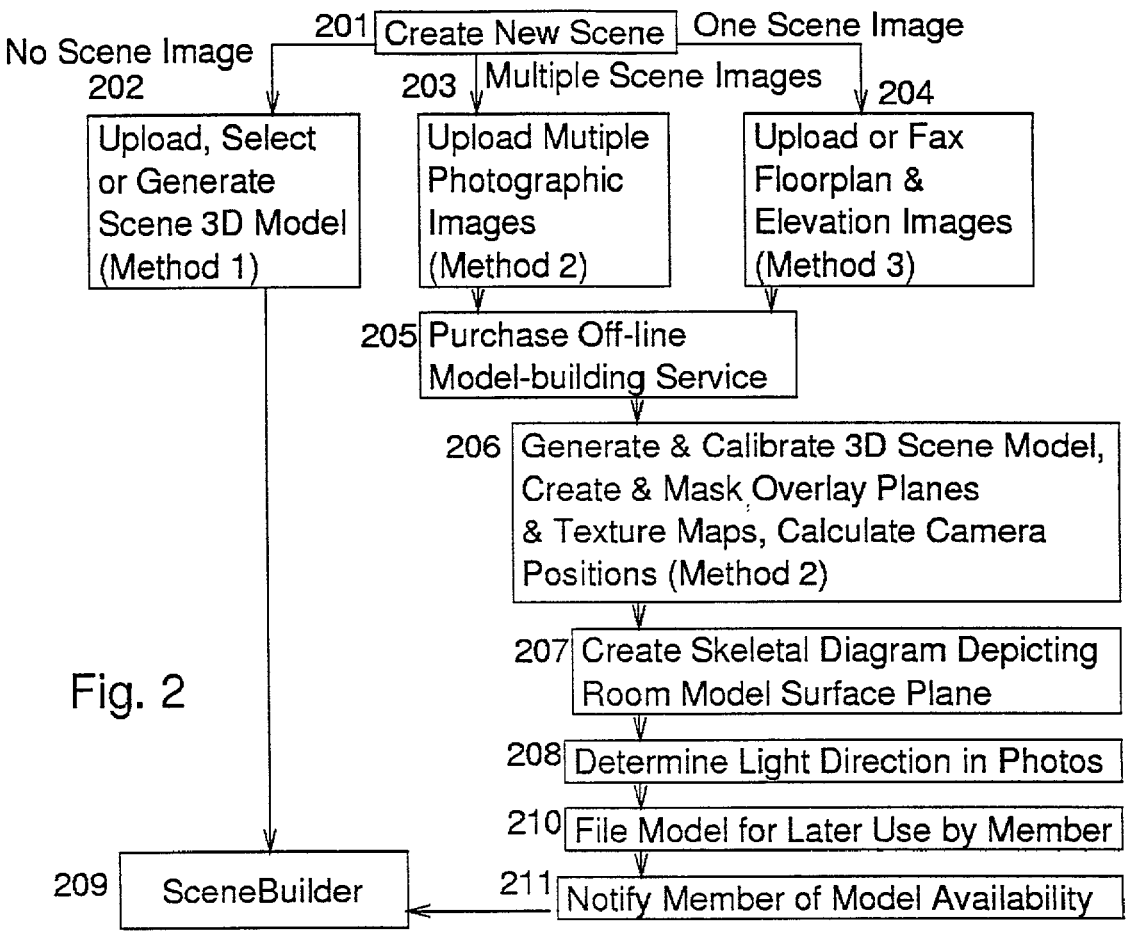
FIG. 2 shows a flow chart expanding certain functions shown within the flow chart of FIG. 1, particularly the uploading and processing of user-supplied digital room images.

As shown in FIG. 2, one of three methods will be utilized for generating a 3D-room model to Create New Scene 201. Method 1 at 202 involves uploading a 3D model or model pair of a room, or selecting such a model pair from a library of models, or generating such a model pair using an interactive model generation tool. This tool will be designed to capture detail information sufficient for the generation of a basic 3D room model of the desired size, shape and height. From here, the user can enter the Scene Builder 209 (described in the earlier reference to 116). The Scene Builder 209 is, for example, a customized commercial Web3D software application running in a browser.

Method 2 at 203 involves multiple digital photographic images of the same room, taken from different camera angles, where the actual distance between two points appears in two images. By human intervention and appropriate software, a 3D model pair may be built.

Method 3 at 204 involves uploading a single digital photographic image, or even simple dimensions, of a room. Again, human intervention is required to transform this into a 3D model pair.

Images uploaded under any of the methods 2-3 will be processed by a human artist into working 3D models using one or more techniques that permit the rendering of 2D pictures and/or specification data into 3D room models. This model construction process requires the development and calibration of models that have nearly perfect alignment with any designer-supplied photographic image or images. This requires creating not only the room model geometry, but also overlays for all walls, floors and ceilings visible in the room scenes. These will be carefully masked to allow textures like wall paper and carpeting to be accurately rendered on such surfaces without interfering with objects between the camera and the subject surfaces. Such objects, which must be masked, include plants, art work on walls, and existing furniture between the camera and a wall, floor or ceiling.

Designer manipulation of CAD drawings or photographic images of actual rooms with the software tools of the present invention will permit production of photorealistic images of the designer's vision. However, the process of creating 3-D models of rooms from two or more images of such rooms can not at present, circa 2002, be automated. Simple compositing is possible, but does not allow shadows and reflections to be generated by retracing on the server computer. Accordingly, only 3-D scenes will be allowed.

In the case of Method 2, the artist will use commercially available software tools to calculate the camera position that was used to take each picture. This will be accomplished in conjunction with creating the background scene models, by mapping like points across multiple images.

In all three methods, other commercially available tools will be utilized to edit the models, create texture maps, and thereby prepare the models for use 206. A skeletal diagram may be created that illustrates each surface plane, allowing the designer to specify textures or colors for each individual plane 207. In methods 2 and 3, the artist may also make a determination of the direction of natural light in the photos 208, for use in rendering the image. In the case of Method 3, the artist will use commercially-available software tools to build a model of the room 204 from the room image, and dimensions provided by the designer.

Designers may be charged for the development of such room models 205, however, such cost may be refundable with the purchase of furnishings. Such human artist intervention will not be required if the designer chooses Method 1 for loading a room scene. However, Method 1 has its limitations—namely the designer must build or have built a 3D model of the room, or he or she must select a room model from a library of room models, or use a floor plan tool or provide specifications to generate one. In addition, such basic models may not fully reflect the design of the actual room being furnished. For example, such "stock" models may lack certain architectural details.

Once these room models are ready for use by the designer, they will be filed on a server in the member's designated on-line file for later use 210, and the member will be notified that the model is ready for use 211.

As shown in FIG. 1, once the Member is ready to begin laying out furnishings in the room, he or she will open a room scene model in the Scene Builder 116, and begin searching for images of appropriate furnishings, fabrics and textures, using the system's search tools 117. (Scene Builder is a product name of DecorMagic, Inc., San Diego, Calif.) The scene builder view 116 will contain a 3-D perspective view of the room to be furnished, search tools, and thumbnail images of selected furnishings and textures. Clicking on such thumbnails will allow the designer to visualize the object in a larger size on the screen. Further clicking will allow zooming into any part of the image, using proprietary technology, to allow for closer inspection.

Once individual furnishings have been selected for visualization in the room scene, selecting the desired thumbnail and then relocating the thumbnail to the desired location (using the Web3D browser's toolset) will automatically locate a properly scaled representation of the furnishing into the room. A tool will allow selected texture to be applied to the subject furnishing. This will allow such textures to be shown running the improper direction, and to scale, on the designated furniture object and with the selected lighting effects once the room image is photo-realistically rendered. Any furniture object may be rotated about its vertical axis to the desired angle by using the tools of the Web3D browser. Room surface textures like wall paper and carpet, or wall or ceiling paint color (collectively referred to herein as textures) can be selected and applied in a similar manner, such as by clicking on the texture, and then on any wall, ceiling or floor area designated on a 3D perspective view of the room.

A tool may be provided to allow the designer to specify the location of any windows that should be the source of lighting in the completed rendering.

Then, in the case of Method 1, the designer will select the desired camera position for rendering 118. This will be accomplished by utilizing the Web3D browser tools. Camera height can be specified in this matter as well. However, if the room model was photographically-derived (constructed from two or more photographic images), then the designer will specify which actual camera position to use for a particular rendering. Multiple renderings, from different actual or virtual camera positions can also be requested, included close-up views of individual furniture groupings or areas of the full image. Room lighting parameters can also be specified 119. The method of so specifying, which permits the rendered image to project similar lighting and shadows on the virtual objects, may be, by way of example, that method more fully described in the proceedings from Siggraph 2000, Course 16, at page 354. Another method would involve the placement of cone-shaped light objects in or outside the scene, using the tools of the Web3d browser. Specifications could then be set for each such lighting object using tools built into the web3d browser. The room scene is now complete and ready for rendering. By clicking the rendering button 120, the process of rendering the scene on the server computer is initiated. This involves exporting and translating the object and scene parameters either on the client, or the server, or both, into a scene file suitable for photorealistic rendering on the server. In this manner, an accurate and high-quality image of a professionally decorated existing or to-be-built room can be rendered on the server and returned to and displayed on the client computer to guide an iterative design process and to help a designer communicate design concepts to his or her client and for procurement.

Finally, foreign objects (like images of art work), may be imported 121/122; budgets and invoices may be prepared and printed 123, and furnishings may be ordered 124. This system will also allow swatches 125 and high-resolution prints of the rendered images to be ordered in various sizes 126, and the rendered images to be posted to a public or private virtual gallery 127. In addition, it will be possible for rendered images to be saved in user files 128, on the server, and e-mailed or otherwise transmitted 129 to third-parties on the network for review or approval.

Normally, the rendering of complex 3D images can take many minutes or even hours (circa 2000) of computing time. The present invention contemplates dividing the rendered image into a number of sub-images before rendering begins, such that each sub-image can be rendered in parallel on a separate computer (parallel or massively parallel processing). Once the individual sub-images have been rendered, they will be reassembled for presentation to the designer on his Internet browser. By this mechanism, or some other computing mechanism that achieves a similar result, the rendered image should be available for viewing very quickly-possibly in less than one minute. Changes can then be made in the location of objects or the camera, the selection of finishes, etc., and the rendering process repeated until the designer is satisfied with the design.

Figure 3:
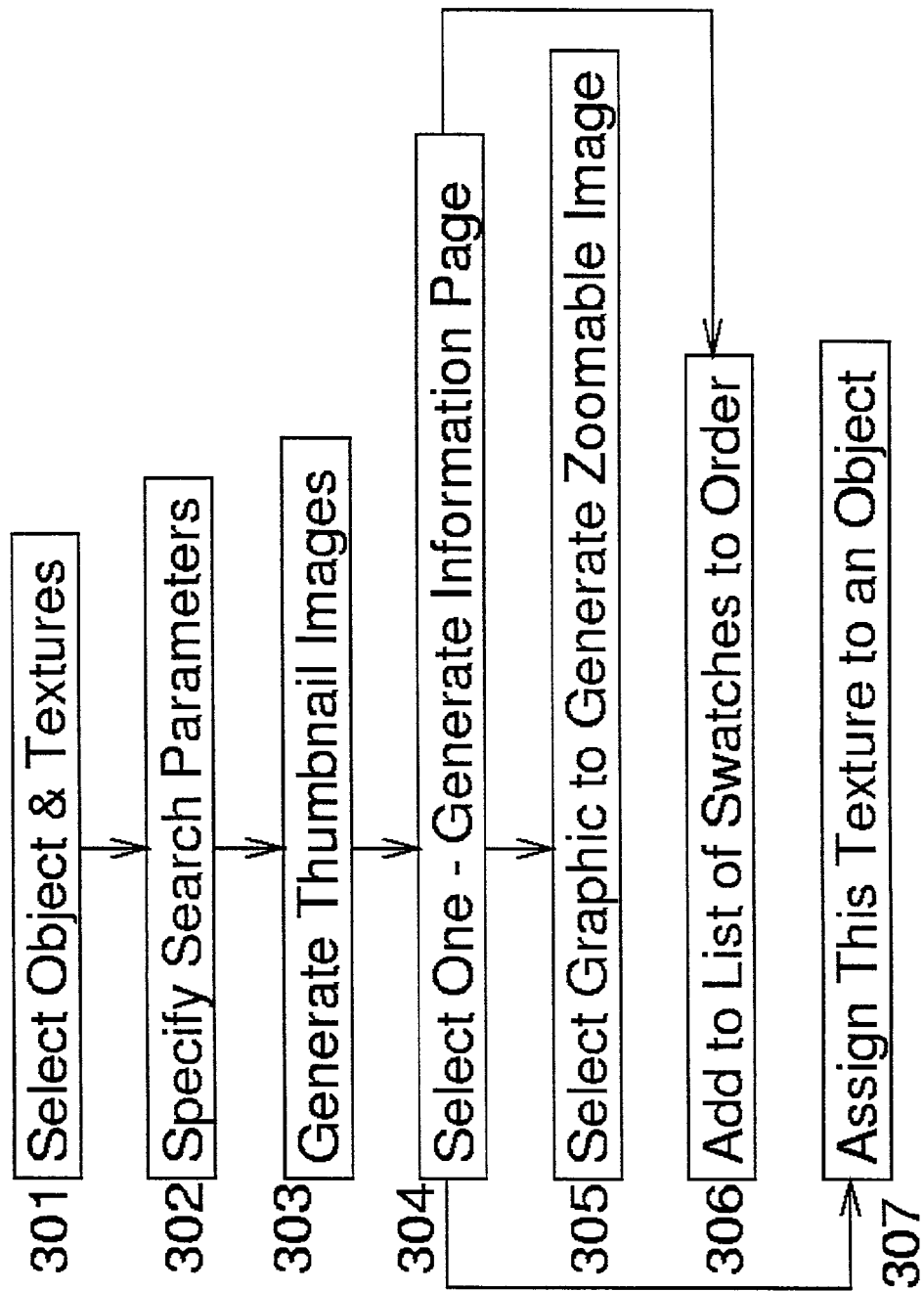
FIG. 3 shows a flow chart expanding the functions related to selecting objects and textures.

FIG. 3 illustrates some of the details associated with the process of selecting objects and textures 301. First, search parameters are specified in 302. Based upon these parameters, objects or textures that match the specified parameters are displayed as thumbnail images 303. The designer then selects one such thumbnail image, and the associated information page, which includes text as well as graphical information about the object or texture is displayed 304. The graphical information can then be inspected more closely by zooming into any area, repeatedly, to view greater and greater detail for smaller and smaller sections of the image 305. Then, in the case of textures, if the designer wishes to order a swatch of the selected material, he/she can do so by clicking a check-box, and add this material to the list of watches to order 306. From 304, the designer can also elect to assign this texture to a specific object 307.

Figure 4:
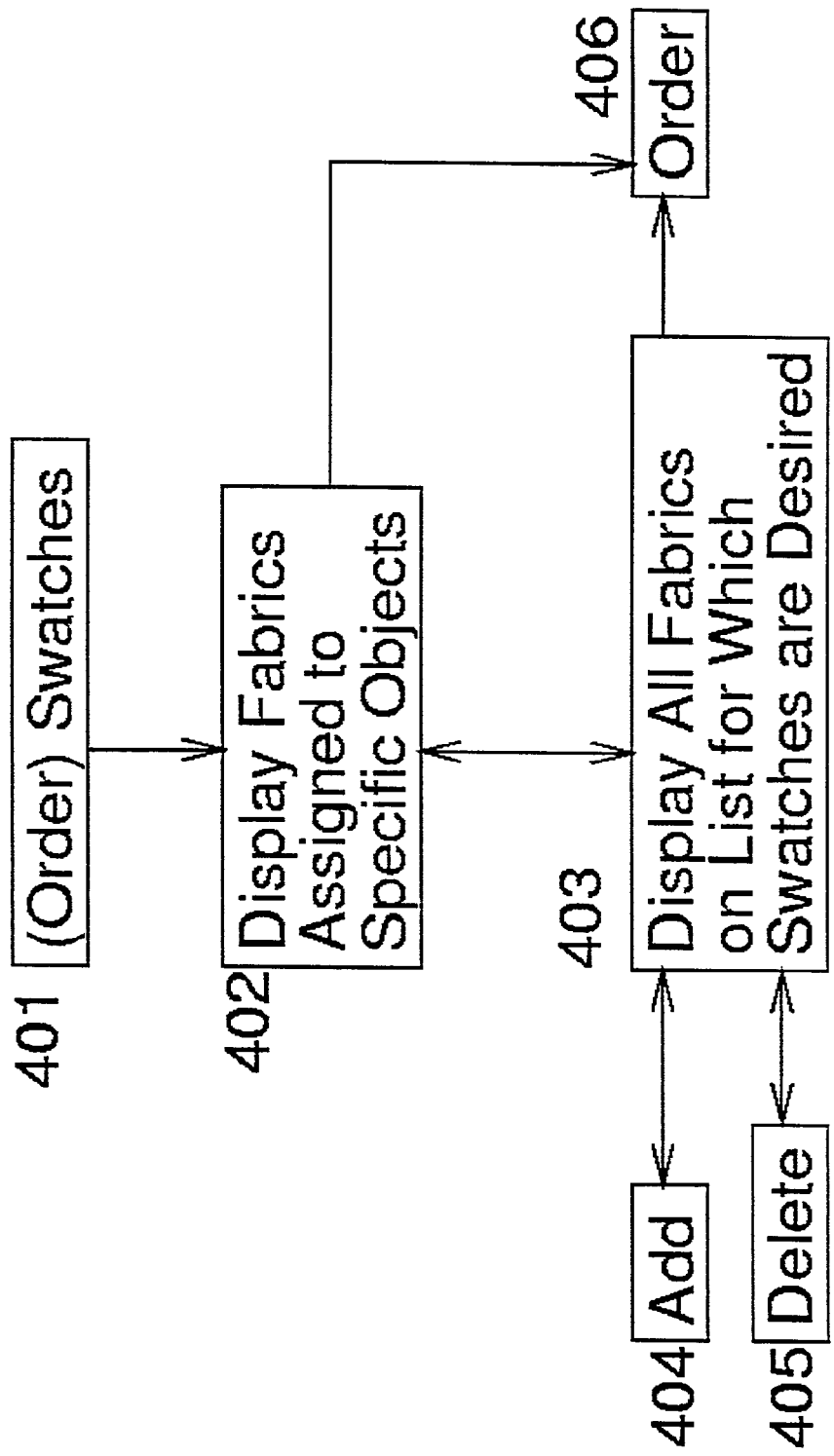
FIG. 4 shows a flow chart expanding the functions related to ordering swatches.

FIG. 4 illustrates the method by which swatches can be ordered, once the desired materials are specified 401. The list of fabrics assigned to specific objects can be displayed 402. This list can be replaced with a list 403 of all fabrics the designer has selected (in 306). The designer can add to 404 or delete from 405 fabrics in this list. From either 402 or 403, the designer can place an order to have all the swatches on the list 406.

Figure 5:
FIG. 5 is a prior art depiction of the screen of a computer running a browser and a browser plug-in for the selection, placement and angular orientation of miniature, low-resolution, 3D textured models in the environment of a room.

A prior art depiction of the screen of a computer running a browser and a Web3D browser plug-in for the selection, placement, angular orientation and display of small, low-resolution, 3D textured models in the environment of a room is shown in FIG. 5.

Figure 6A:
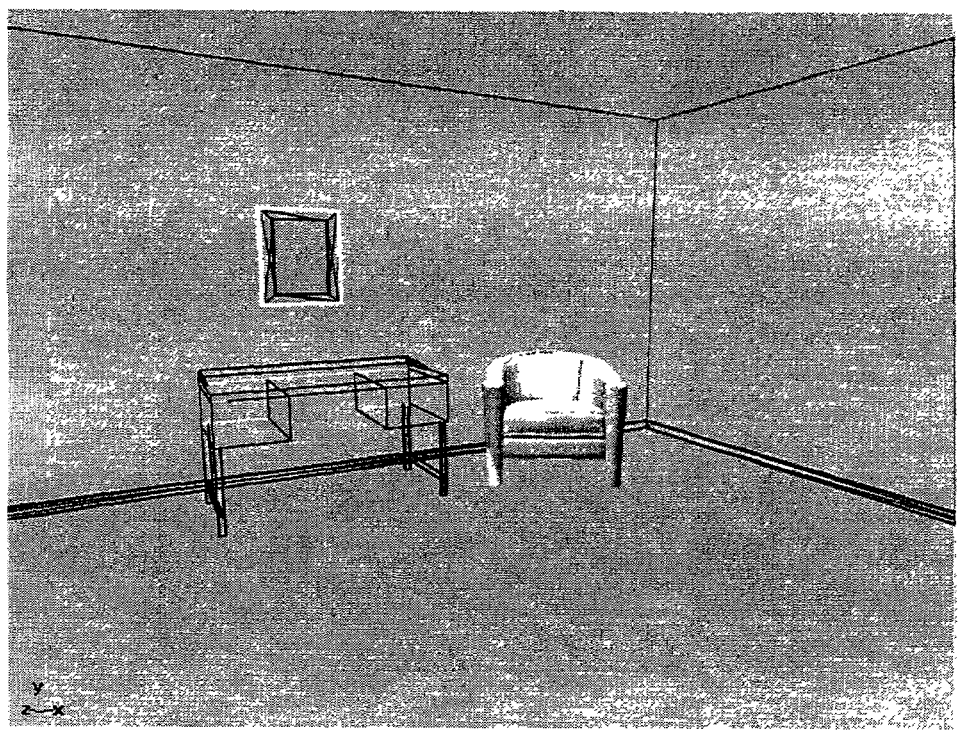
FIG. 6a is a diagram of a simulated screen view, rudimentary and low resolution in terms of the graphics contained therein, presented to a user/viewer/client/prospective purchaser and/or his/her/their professional representative(s), and manipulatable thereby, (i) to choose a scene and, potentially, scene texture and/or lighting, and (ii) to choose, place and orient object items therein.

A diagram of a simulated screen view, rudimentary and low resolution in terms of the graphics contained therein, is shown in FIG. 6a. This view is presented to a user/viewer/client/prospective purchaser, and/or his/her/their professional representative(s). The view is manipulatable, such as by the screen controls shown in FIG. 5 (not shown in FIG. 6a) (i) to choose a scene and, potentially, scene texture and/or lighting, and (ii) to choose, place and orient object items therein.

Figure 6B:
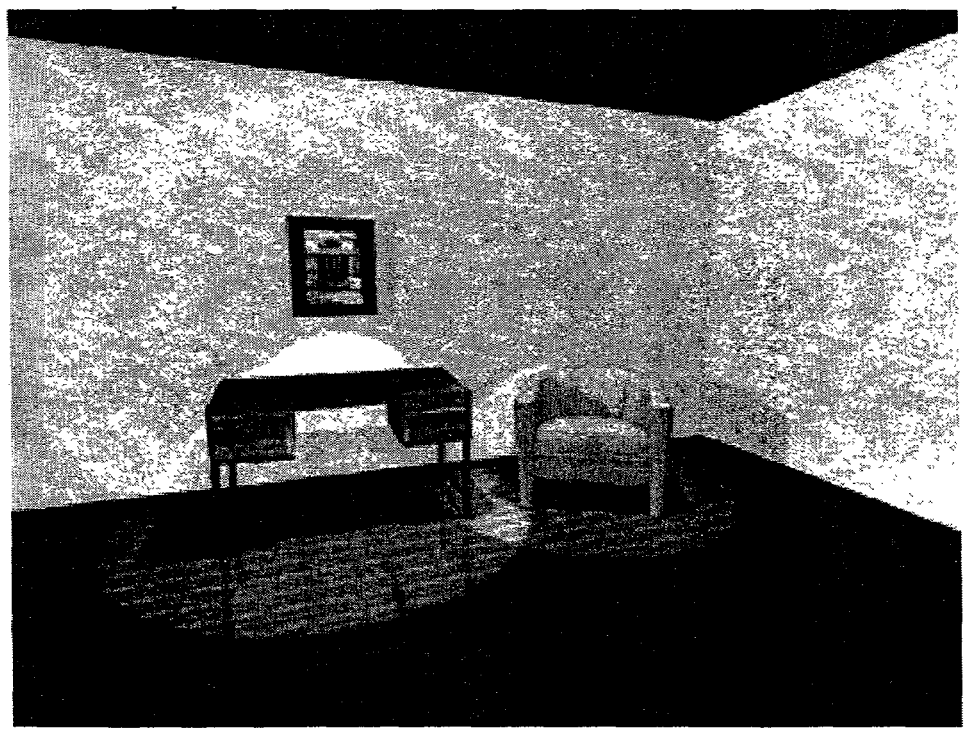
FIG. 6b is a diagram of a simulated screen view, photorealistic in nature, extensively rendered on a server computer from extensive pre-existing digital models in accordance with instructions from a user/viewer/client/prospective purchaser computer received in accordance with FIG. 6a, the photorealistic screen having been returned over a digital communications network to this user/viewer/client/prospective purchaser computer for display thereat.

A diagram of a simulated screen view, photorealistic in nature, extensively rendered on a server computer from extensive pre-existing digital models in accordance with instructions from a user/viewer/client/prospective purchaser computer received in accordance with FIG. 6a is shown in FIG. 6b. This photo-realistic screen having been returned from the server/graphics computer over a digital communications network to this user/viewer/client/prospective purchaser computer for display.

Figure 7A:
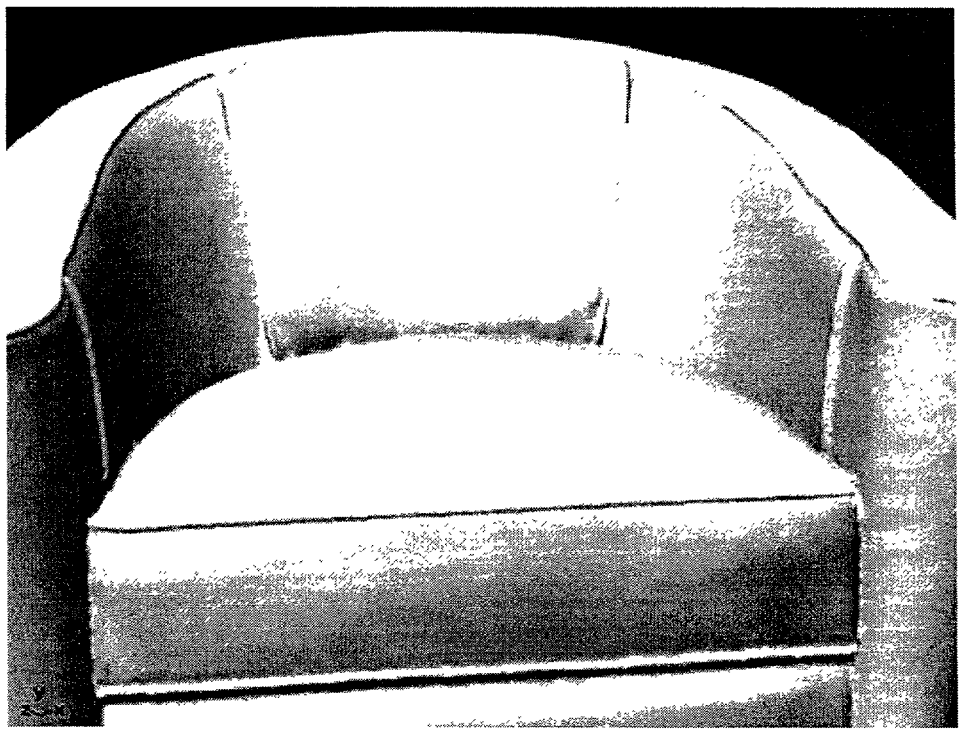
FIG. 7a is a diagram of a simulated screen view, similar to FIG. 6a, of a rudimentary 3D model of a chair, the rudimentary model preliminarily presented to a user/viewer/client/prospective purchaser and/or his/her/their professional representative(s), and manipulatable thereby, for cursory selection, location in a scene, choice of fabric, choice of lighting, etc.

Another diagram, similar to FIG. 6a, of a simulated screen view is shown in FIG. 7a. The view is of a rudimentary 3D model of a chair, being the rudimentary model preliminarily presented to a user/viewer/client/prospective purchaser and/or his/her/their professional representative(s). As before, this scene view (and the underlying data) is manipulatable for purposes of, inter alia, selection, location in a scene, choice of fabric, choice of lighting, etc.

Figure 7B:
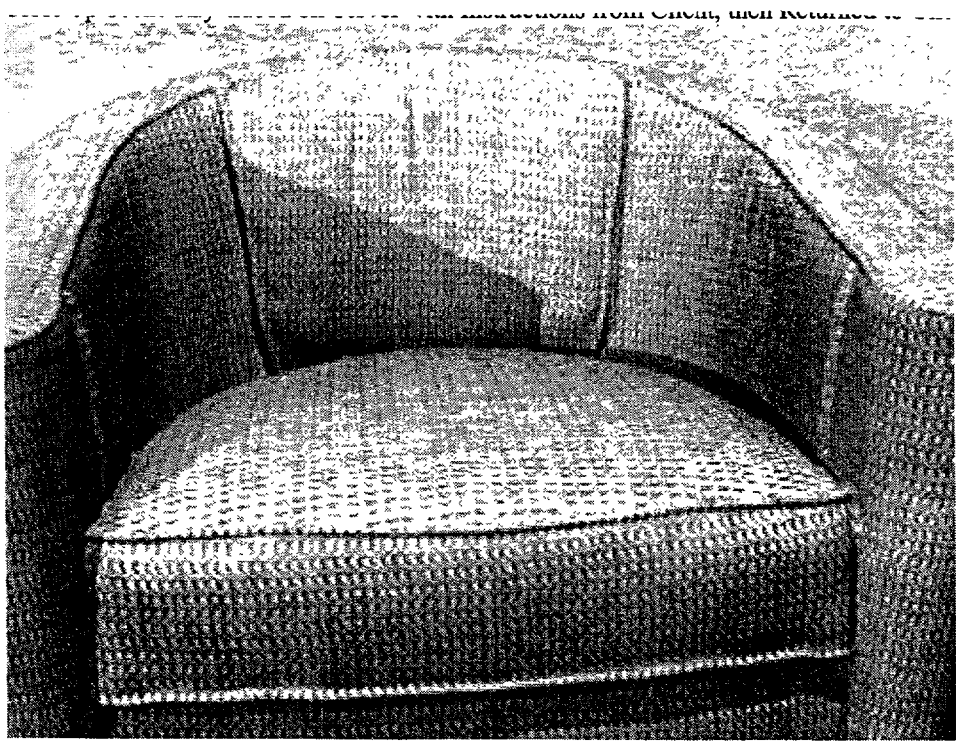

A diagram of a simulated screen view, similar to FIG. 6b, of the chair previously seen in FIG. 7a is shown in FIG. 7b. This view is photorealistic. See, for example, the texture of the fabric, the shadows, the wrinkles, and even the slight distortion in the welting of the seat cushion of the chair.

The principals of the present invention should not be regarded as being limited solely to interior design and interactive advertising. FIG. 6 and FIG. 7 particularly illustrates how the present invention also supports a novel form of interactive image generation for used in advertising. In this embodiment of the present invention, an advertising image designer would also be able to preview a close-up view of a chair, with the desired fabric, in a scene of his or her own choosing. Camera angles and lighting could be adjusted until the desired scene was assembled. The scene would then be photorealistically rendered. A number of such scenes could be rendered to support the development of a television commercial. Furthermore, the background scene need not be from the real world, nor even possible. In such a motion picture commercial, for example, the chair could be shown slowly landing on the moon, with proper shadows falling on the moon from each position prior to landing and upon landing.

6. The Future

The primary reason that very large models and textures are required on the server in the system and method of the present invention is to permit zooming. In the absence of the need to zoom and/or the need to display fine texture, much smaller models could be used. Recent developments circa 2002 portend that only those portions of large models and textures that will be viewed in a particular sub-scene will be downloaded over the Internet for client-based rendering. Because only model fragments would the download, at least in some cases, such a system would eliminate some of the benefits of the server-based retracing of the present invention. In essence, such future systems are directed to permitting models and textures to be downloaded at a size (resolution) necessary and adequate for the particular (sub-)image being constructed. This is essentially a system for dynamically generating models and textures at a resolution optimized for a particular need.

Clearly the system of the present invention does not involve such dynamically generated models and textures at the client computer(s). Instead, it loads models and textures of full resolution into the retracing software of the server computer, only. Progress in ray tracing software and hardware may, however, ultimately achieve rendering efficiencies adequate to the photorealistic applications of the present invention by somehow reducing the resolution of the models and textures at rendering time to a reasonable level (i.e., "reasonable" to the client computer).

Even in such a futuristic system, however, there is good reason—previously explained—to develop and to maintain the high resolution models centrally. This is what the present invention teaches to do.

7. Recapitulation, and Relation of the Method of the Present Invention to Existing Graphics Processes Accordingly, there exist several methods for implementing the "middleware" that will translate the low resolution scene data—as might be developed in a Web3D type system—into a scene file suitable for photorealistic (ray tracing) rendering, replete with customized lighting.

The translation takes place on the client in the client browser plug-in; or in a proprietary 3D browser; or on a server, or on a combination thereof.

The translation will result in a scene file useable by a Renderman-compliant rendering software, or a Mental-Ray-compliant rendering software, or a Pov-Ray compliant rendering software, etc.

Individual lights will be placed just like other objects in the scene, and will be depicted as cones so that they can be pointed at the object to be illuminated, with the beam-spread of each light source illustrated by the shape of its cone.

Automatic lighting (one or two front lights) can also be selected. Lighting intensity, light by light, can be user-specified. Lighting color and color temperature, by light, can also be user-specified. Global illumination can also be selected.

The method used to substitute the high-resolution models and textures for the stand-in models and textures involves simple "include" statements in the scene file. This is the superior, and unique to the present invention way to accomplish this: because the object models are so large, if they must be embedded in the scene files, then the scene files also become very large.

The large models may be cached on the server to added processing efficiency. The server may then divide the image into several individual tiles, that can then, if necessary or desired. be distributed to various nodes on a "rendering farm" of computers, to allow parallel processing: this may all be accomplished by utilizing rendering software that has "built-in" parallel processing or tiling features, or by utilizing specialized tiling and queuing software.

The user will be able to specify parameters for the camera lens (angle of view)—as is already explained in the related predecessor application.

The object modeling and high-fidelity photorealistic image rendering service contemplated by the present invention will be offered to, inter alia, advertising professionals, typically on a project-by-project basis. Meanwhile, model-building will distinctly exceed the image quality of "cartoonist" image processing systems. When manufacturers, and advertising professionals, physically make their products available, the high resolution models will be built. They will thereafter be maintained proprietary on the server. No end-user client need ever get his/her/their hands on any high resolution models. A client will pay fees for the use of the models, and for our rendering and hosting services.

8. Adaptations, Extensions, and Variations

In accordance with the preceding explanation, variations and adaptations of the (1) interior decor composition and display, (2) advertising, and (3) fulfillment systems and methods of the present invention will suggest themselves to practitioners of the (1) digital computer imaging, (2) advertising, and (3) e-commerce arts.

For example, the (1) composition and display could be of architect-designed additions to a residence. For example, the (2) advertising could be of resort apparel, illustrated on the prospective purchaser at the actual resort to be visited. For example, (3) designers without showrooms, or even any such capital as would permit their creations to be fabricated in advance of purchase, could display their designs of expensive and/or extensive and/or physically large pieces in situ, thereby showing the products of their imaginations in virtual reality.

In accordance with these and other possible variations and adaptations of the present invention, the scope of the invention should be determined in accordance only with the following claims, and not solely in accordance with that embodiment within which the invention has been taught.

What is claimed is:

1. A computerized method of generating and rendering over a digital communications network a high-quality perspective view image of an object that can exist in the real world located within, surrounding, or in front of, a three-dimensional scene that can also exist in the real world, the method of presenting a perspective view image of an object in a 3D scene comprising:

producing or selecting at a first computer upon a digital communications network
(1a) a 3D model of the background, (1b) precursors of the 3D background model, (1c) one or more related 2D views of the background scene suitable to serve as precursors of the 3D background model,
(2) for (1b) and (1c) associated dimensional information of the particular 3D scene, and
(3) a suitably-real-world object positioned and oriented in the background scene; and
for which companion low-quality stand-in 3D models are derived or selected for use in rendering a preview image at the first computer;

using scene editing software on the first computer to place the object in the scene, while rapidly rendering the scene at the first computer using the companion low quality stand-ins to guide the placement, a preview quality perspective view image of the object positioned and oriented in the background scene from the desired viewing angle and camera position for use in allowing a rapid, iterative evaluation and modification of the scene, until the desired perspective view of the scene is obtained, and then (in order to obtain a high-quality perspective view image of the scene);

transmitting from the first computer upon the digital communications network the information (1)-(2) and the identity of the selected object and its location, orientation and other parameters;

receiving at another, second, computer upon the digital communications network the background scene information and object identity and parameters;

deriving in the second computer if not transmitted from the first computer (4) a high-quality 3D background model of the represented and selected 3D background scene; and utilizing in the second computer the (1)-(2) background scene information and the identified high-quality object and its parameters and any (4) derived high-quality 3D background scene model to generate and render in consideration of (5) a camera position and orientation, (6) a perspective view image of the selected object in the 3D scene; and then transmitting from the second computer upon the digital communications network the (6) perspective view image; and receiving at the first computer upon the digital communications network this (6) perspective view image; and displaying at the first computer this (6) perspective view image;

wherein the object, having an associated geometry, is rendered with specified parameters in proper (1) scale, (2) position and (3) rotation within the perspective view image;

wherein the entire computer-generated perspective view image is rendered and viewed with the same proper perspective that a conventional photo of the same scene would exhibit, if captured by a camera; and wherein object selection, parameterization, placement and orientation in the scene made interactively over a digital network supports the generation of a perspective view image having proper parameterization and perspective showing an object located and oriented within a 3D scene.

2. The computerized method of generating and rendering a high-quality perspective view image according to claim 1
wherein the iterations are further for illuminating the object in the scene so as to develop lighting parameters;
wherein the communicating is also of the lighting parameters; and
wherein the rendering of the second, high-quality perspective view image of the 3D object located and oriented in the 3D scene is further in consideration of the developed lighting parameters.

3. The computerized method of generating and rendering a high quality perspective view image according to claim 1
wherein the iteration is further for specifying quality parameters of the object in the scene;
wherein the communicating is also of the quality parameters; and
wherein the rendering of the second, high-quality perspective view image of the object located and oriented in the scene is further in consideration of the specified quality parameters.

4. A computerized method of generating and rendering over a digital communications network a high-quality perspective view image of a three-dimensional (3D) object that can exist in the real world located within, surrounding, or in front of,
a 3D scene that can also exist in the real world, the method of presenting a 3D perspective image of a 3D object in a 3D scene comprising:

rendering at a first computer, communicative upon a digital communications network, a first, low-quality, perspective view image of a 3D object in a 3D scene from
(1) a low quality 3D model of the suitably-real-world object,
(2) a relatively low quality 3D model of a selected suitably-real-world scene, in consideration of
(3) a selected 3D coordinate position and angular orientation of the 3D object in the 3D scene,
(4) location and orientation of a camera view onto the scene,
(5) scene and object size;
(6) parameter of the scene lighting, and
(7) parameters of quality of any one or both of the object and of the scene;

wherein this first, low-quality, perspective view image simply shows the 3D object located and oriented in the 3D scene;

communicating from the first computer upon the digital communications network the information (1)-(7) to a second computer;

from information (1), selecting in the second computer (1a) a high-quality 3D model of the selected suitably-realworld object, and from information (2), receiving at, selecting, or generating in the second computer (2a) a high-quality 3D model of the selected suitably-real-world scene;

rendering at the second computer a second, high-quality, perspective view image from (1) the high-quality 3D model of the selected object, or derivatives or extensions of this model, and (2a) the high-quality 3D model of the scene, or derivatives or extensions of this model, in consideration of at least the information (3)-(7);

wherein the second, high-quality, perspective view image is a high-quality image of the 3D object in the 3D scene;

communicating from the second computer upon the digital communications network to the first computer the second, high-quality 3D perspective view image; and displaying at the first computer this second, high-quality, perspective view image.

5. The method according to claim 4 exercised to the purpose that a prospective purchaser of the suitably-real-world 3D object may be rendered the second, high-quality perspective view image of an object that is a virtual object;

wherein should the virtual object be made real in the world, then it would not merely suitably exist within the suitably-real-world 3D scene, but would suitably so exist as depicted in the second, perspective view image.

6. The method according to claim 4 wherein the rendering at a first computer of the first, low-quality, perspective view image is from (1) a low-quality 3D model of a scene derived at the first computer.

7. The method according to claim 4 wherein the rendering at a first computer of the first, low-quality, perspective view image is from (1) a low-quality 3D model of the object received upon the communications network from the second computer as a model dynamically generated from specifications provided to the second computer by the first computer.

8. The method according to claim 4 wherein the rendering at a first computer of the first, low-quality, perspective view image is from (1) a low-quality model of the object received upon the communications network from a third computer as a model from a pre-existing catalog of low-quality 3D object models.

9. The method according to claim 4 wherein the rendering at a first computer of the first, low-quality, perspective view image is from (2) a low-quality 3D model of the scene received upon the communications network from the second or a third computer as a model dynamically generated from specifications provided to the second computer by the first computer.

10. The method according to claim 4 wherein the rendering at a first computer of the first, low-quality, perspective view image is from (2) a low-quality 3D model of the scene received upon the communications network from a third computer as a model from a pre-existing catalog of low-quality 3D object models.

11. The method according to claim 10 wherein the (1) low-quality 3D model of a selected suitably-real-world object received upon the communications network from the third computer is of an object for sale.

12. A computerized method of generating and rendering over a digital communications network a perspective view of a three-dimensional object that can exist in the real world located within a three-dimensional space that can also exist in the real world, the method of presenting a perspective view image of a 3D object in a 3D space comprising:

using at a client computer upon a digital communications network
  (1) one or more accurately-scaled 3D models representing one or more associated suitably-real-world 3D objects, and
  (2) an accurately-scaled model of a 3D scene in which 3D scene the suitably-real-world 3D objects can exist,
  (3) associated scene camera and lighting parameters,
  (4) associated placement and rotational information regarding where and at what positional attitude the one or more 3D objects are placed within the 3D scene;

transmitting from the first computer upon the digital communications network the information (1)-(4);

receiving at another, second, computer upon the digital communications network the information (1)-(4);

in the second computer
  in accordance with at least the information (1) selecting or generating (1a) a detailed, high-quality, model of the one or more 3D objects.
  in accordance with at least the information (2) selecting or generating (2a) a detailed, high-quality, model of the 3D scene, and
  in accordance with the (1a) and (2a) models, and information (3)-(4) and extensions thereof, a high-quality perspective view image of the one or more 3D objects properly scaled, located and oriented within the 3D scene is rendered; and then transmitting from the second computer upon the digital communications network this high-quality perspective view image; and receiving at the first computer upon the digital communications network this high-quality perspective view image; and displaying at the first computer this high-quality perspective view image.

13. The method according to claim 12 exercised to the purpose that a prospective purchaser of one or more of the one or more suitably-real-world objects may be rendered the high-quality perspective view image where at least one of the one or more 3D objects is a virtual object not existing in the world, and which might only suitably exist within the suitably-real-world 3D scene;

wherein even though at least one 3D object shown in the high-quality perspective view is virtual and does not actually exist, the 3D object both (i) could exist, and (ii) could exist as so shown within the high-quality perspective view.

14. A computerized method of producing a high quality perspective view image on and between at least two computers communicating over a digital communications network, the method comprising:

providing from a server computer across a digital communications network to a client computer (i) a catalog of small, low-quality, 3D graphics models of objects and (ii) at least one 3D graphics model of a scene in which the objects may exist;

selecting at the client computer one or more objects and at least one scene;

communicating these selections from the client computer across the communications network to the server computer;

responsively to receipt of the selections, providing from the server computer across the communications network to the client computer a set of at least the associated small, low-quality 3D models;

manually manipulating at the client computer spatial (i) positions and orientations of a selected one or more object models from the set of models (ii) within the at least one scene model, and rendering at the client computer from these object and scene models, a first, low-quality perspective view image of the one or more selected objects in the at least one scene, this low-quality perspective view image being used as a preview;

communicating, from the client computer across the communications network to the sever computer, at least camera, lighting and image size parameters, and positional placements and orientations of each of the selected and manipulated one or more objects in the at least one scene;

from the received positional placements and orientations of the selected one or more objects, rendering in the server computer from associated large high-quality 3D models of the selected one or more objects and of the at least one scene, a 3D high-quality perspective view image of the selected one or more objects located and oriented in the scene;

communicating from the sever computer upon the digital communications network to the client computer the rendered high-quality perspective view image; and displaying at the client computer this rendered high-quality perspective view image.

15. The computerized method of producing a high-quality image according to claim 14 wherein the rendered high-quality perspective view image is suitable to serve as advertising copy, meaning in particular that it is devoid of clearly visible defects;

wherein a 3D graphic artist of this rendered high-quality perspective view image who performs selections and manipulations at the client computer need not have to attend to; and did not actually attend to, the building of the 3D models and any textures, which building transpired elsewhere.

16. The computerized method of producing a high quality rendered image according to claim 15 wherein the building of the 3D models and any textures transpired in a model-building computer.

17. The computerized method of producing a high quality rendered image according to claim 15 wherein the rendered high-quality perspective view image is suitable to serve as advertising copy, meaning in particular that it is devoid of clearly visible defects;

wherein a 3D graphic artist of this rendered high-quality perspective view image who performs selections and manipulations at the client computer need not have to attend to, and did not actually attend to, the rendering, which transpired in the server computer.

18. A method of rendering at high quality a perspective view image as a business service on a digital communications network, the high-quality perspective view image rendering business service comprising:

providing from a server computer across the digital communications network to a client computer any of (i) a catalog of small, low-quality, 3D graphics models, or (ii) a tool for generating small, low-quality, 3D graphics models, or (iii) an actual, small, low-quality, 3D graphics model of at least (1) objects and (2) scenes in which the objects may exist;

receiving at the server computer upon the digital communications network from the client computer information as to the identities of at least one object and at least one scene selected from the catalog, and further information as to the camera and lighting parameters and image size and where and at what orientations selected identified objects are to be placed and oriented in the selected scene;

responsively to received information and further information, rendering in the server computer from associated high-quality 3D models of each selected object and also of the identified scene, a high-quality perspective view image of each selected object located and oriented in the identified scene; and communicating from the server computer upon the digital communications network to the client computer this rendered high-quality perspective view image;

wherein the client computer is provided with a rendered high-quality perspective view image without necessity of either (i) having the high-quality models from which this high-quality perspective view image is rendered, or (ii) rendering this high-quality perspective view image itself.

19. A method performed by (i) a relatively simple client computer running relatively simple software (ii) connected upon a digital communications network to (iii) a relatively powerful graphics server computer running relatively sophisticated graphics image rendering software and/or hardware, of deriving at the client computer a high-quality perspective view image as is a typical product of the graphics server computer and beyond the capabilities of the client computer and hardware and software operating therein, at least within a reasonable period of time, the method by which a networked client computer may bootstrap itself to production of a high quality perspective view image comprising:

receiving in the client computer from the graphics server computer across the digital communications network a catalog of, or tool for generating low-quality 3D graphics models for selected (1) objects and (2) scenes in which the objects may exist;

selecting at the client computer objects and at least one scene from the catalog and downloading the selected objects and/or scene from the graphics server computer across the communications network, or, alternatively as the case may be, generating with the tool object and/or scene models;

manipulating at the client computer the received and/or generated low-quality models to specify spatial positions and orientations of objects within a scene;

communicating these object positional placements and orientations, and also camera, lighting and image size parameters, across the communications network to the graphics server computer;

receiving back from the graphics server computer upon the digital communications network a high-quality perspective view image of the objects placed, oriented, illuminated and viewed from a perspective, as were all derived from the manipulating, and as were communicated to the graphics server computer;

displaying at the client computer this rendered high-quality perspective view image.

20. A computerized method of generating and rendering over a digital communications network a high-quality perspective view image of an object that can exist in the real world located within, surrounding, or in front of, a three-dimensional scene that can also exist in the real world, the method of presenting a perspective view image of an object in a 3D scene comprising:

producing at a first computer running a 3D scene editor, Digital Content Creation, Computer Aided Design, or browser program with or without a plug-in a 3D scene file including a three-dimensional scene and a small model of an object that can exist within the scene;

transmitting from the first computer upon the digital communications network the scene file;

receiving at another, second, powerful graphics computer upon the digital communications network the scene file; and utilizing in the second computer the scene file to generate and render in consideration of (5) a camera position and orientation specified in the scene file, (6) a perspective view image of the object now as a large model in the 3D scene; and then transmitting from the second computer upon the digital communications network the (6) perspective view image; and receiving at the first computer upon the digital communications network this (6) perspective view image; and displaying at the first computer this (6) perspective view image;

wherein the object, having an associated geometry, is rendered as a large model in proper (1) scale, (2) position and (3) rotation within the perspective view image;

wherein the entire computer-generated perspective view image is rendered and viewed with the same proper perspective that a conventional photo of the same scene would exhibit, if captured by a camera; and wherein the scene specification, made interactively over a digital communications network, supports the relatively rapid ray-traced rendering of a perspective view image having proper perspective, showing an object located and oriented in and as a large model within a 3D scene.

21. A computerized method of generating and rendering over a digital communications network a high-quality perspective view image of an object that can exist in the real world located within, surrounding, or in front of, a three-dimensional scene that can also exist in the real world, the method of presenting a perspective view image of an object in a 3D scene comprising:

producing at a first computer running a 3D scene editor, Digital Content Creation, Computer Aided Design, or browser program with or without a plug-in a 3D scene file containing references to 3D objects on the second computer;

transmitting from the first computer upon the digital communications network the scene file;

receiving at another, second, powerful graphics computer upon the digital communications network the scene file; and utilizing in the second computer the scene file to generate and render in consideration of (5) a camera position and orientation specified in the scene file, (6) a perspective view image of the selected object in the 3D scene; and then transmitting from the second computer upon the digital communications network the (6) perspective view image; and receiving at the first computer upon the digital communications network this (6) perspective view image; and displaying at the first computer this (6) perspective view image;

wherein the object, having an associated geometry, is rendered in proper (1) scale, (2) position and (3) rotation within the perspective view image;

wherein the entire computer-generated perspective view image is rendered and viewed with the same proper perspective that a conventional photo of the same scene would exhibit, if captured by a camera; and wherein the scene specification, made interactively over a digital communications network, supports the relatively rapid ray-traced rendering of a perspective view image having proper perspective, showing an object located and oriented within a 3D scene.

22. The computerized method of generating and rendering a high-quality perspective view image according to claim 21
wherein the iterations are further for texturing the object in the scene so as to develop texture parameters;
wherein the communicating is also of the texture parameters; and
wherein the rendering of the second, high-quality perspective view image of the 3D object located and oriented in the 3D scene is further in consideration of the developed texture parameters.

23. A computerized method of generating and rendering over a digital communications network a high-quality perspective view image of an object that can or does exist in the real world located within, surrounding, or in front of, a three-dimensional scene that can or does also exist in the real world, the method of presenting a perspective view image of an object in a 3D scene comprising:

first maintaining upon a server computer upon a communications network both a high resolution 3D model, and a low-resolution stand-in proxy model, of a same object that can or does exist in the real world;

second maintaining at a client computer upon the same communications network an image of a scene that can or does exist in the real world, and in which scene the object is desired by a user to be viewed;

first downloading on the communications network the low-resolution proxy model, only, from the sever computer to the client computer;

manipulating at the client computer interactively with a scene editing software both the low-resolution proxy model and the scene image so as to form a low resolution image of the object in the scene according to the dictates of the user;

uploading upon the communications network the scene image, and at least the parameters of the user-dictated low-resolution image, from the client computer to the server computer;

rendering on and at the server computer running imaging engine software in consideration of at least the downloaded user-dictated low resolution image parameters and the scene image, and also the high-resolution 3D model, an image of the object within the scene that is of higher resolution than is the low-resolution image from the client computer;

second downloading upon the communications network the rendered higher-resolution image from the server computer to the client computer; and displaying the higher-resolution image at the client computer;

wherein the high-resolution 3D model does not leave the server computer during any of the first maintaining, the second maintaining, the first downloading, the manipulating, the uploading, the rendering, the second downloading, and the displaying.

* * * * *